(12) United States Patent
Kryze et al.

(10) Patent No.: US 9,239,627 B2
(45) Date of Patent: Jan. 19, 2016

(54) SMARTLIGHT INTERACTION SYSTEM

(71) Applicant: Panasonic Intellectual Property Corporation of America, Torrance, CA (US)

(72) Inventors: David Kryze, Campbell, CA (US); Jean-Claude Junqua, Saratoga, CA (US); Ricardo Teixeira, San Jose, CA (US); Yue Fei, San Jose, CA (US); Jeremy Lauraire, Toulon (FR); Pierluigi Dalla Rosa, Santa Clara, CA (US); Colin Johnston, San Francisco, CA (US)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/070,769

(22) Filed: Nov. 4, 2013

(65) Prior Publication Data

US 2014/0139426 A1    May 22, 2014

Related U.S. Application Data

(60) Provisional application No. 61/723,652, filed on Nov. 7, 2012.

(51) Int. Cl.
*G09G 5/00* (2006.01)
*G06F 3/01* (2006.01)
*G06F 3/14* (2006.01)

(52) U.S. Cl.
CPC ............... *G06F 3/017* (2013.01); *G06F 3/011* (2013.01); *G06F 3/14* (2013.01)

(58) Field of Classification Search
CPC .......... G06F 3/01; G06F 3/011; G06F 3/014; G06F 3/016; G06F 3/17; G06F 3/02; G06F 3/0425
USPC ..................... 345/1.1–2.3, 156–160, 173–17, 345/204–215, 173–178
See application file for complete search history.

(56) References Cited

U.S. PATENT DOCUMENTS

| | | | |
|---|---|---|---|
| 6,222,465 B1* | 4/2001 | Kumar et al. | 341/20 |
| 6,611,242 B1* | 8/2003 | Hongo et al. | 345/2.1 |
| 7,058,204 B2* | 6/2006 | Hildreth et al. | 382/103 |
| 7,898,522 B2* | 3/2011 | Hildreth et al. | 345/156 |
| 8,274,535 B2* | 9/2012 | Hildreth et al. | 345/676 |
| 2002/0064382 A1* | 5/2002 | Hildreth et al. | 396/100 |

* cited by examiner

*Primary Examiner* — Vijay Shankar
(74) *Attorney, Agent, or Firm* — Joseph G. Chu; JCIP

(57) ABSTRACT

The conference room automation apparatus employs a processor-based integrated movement sensor, lights, cameras, and display device, such as a projector, that senses and interprets human movement within the room to control the projector in response to that movement and that captures events occurring in the room. Preferably packed in a common integrated package, the apparatus employs a layered software/hardware architecture that may be readily extended as a platform to support additional third-party functionality.

14 Claims, 10 Drawing Sheets

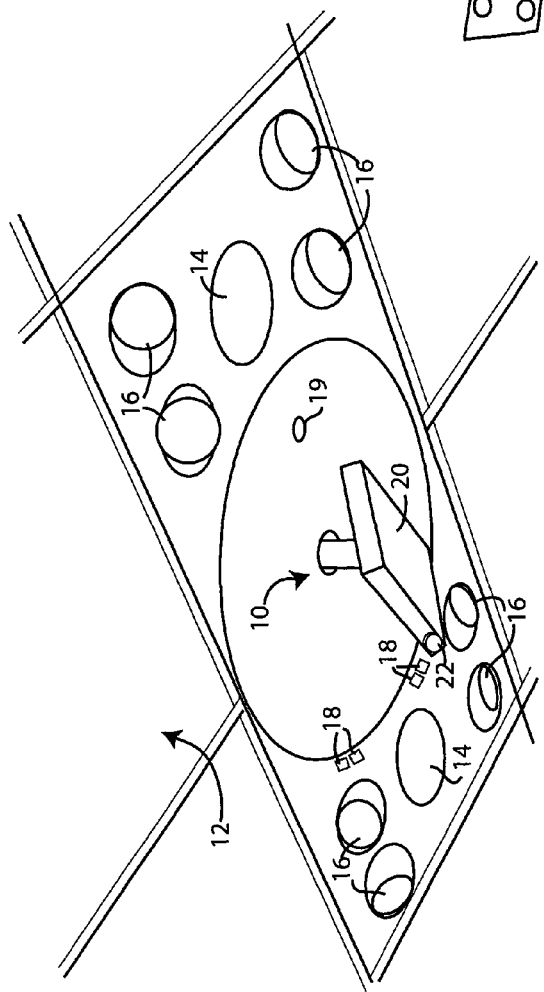
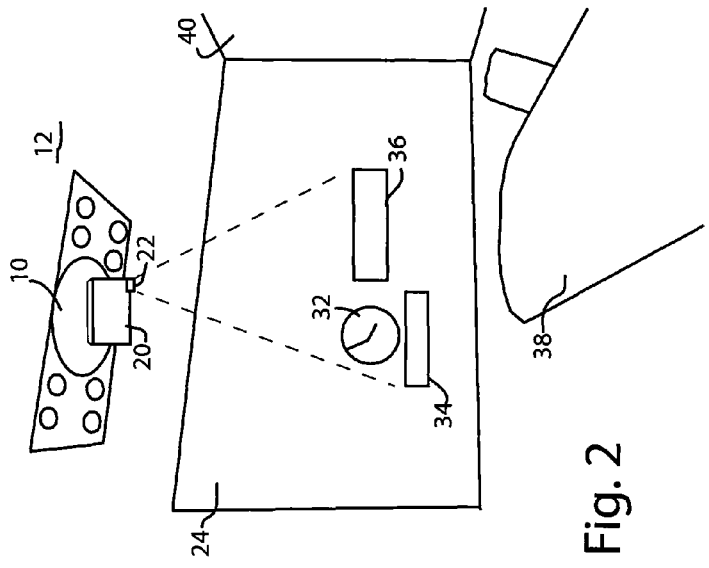
Fig. 1
Fig. 2

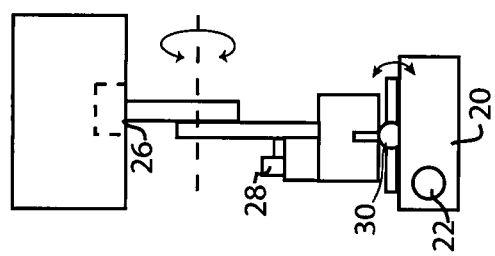

SMARTLIGHT INTERACTION SYSTEM

CROSS-REFERENCE TO RELATED APPLICATIONS

This application claims the benefit of U.S. Provisional Application No. 61/723,652, filed on Nov. 7, 2012. The entire disclosure of the above application is incorporated herein by reference.

FIELD OF THE DISCLOSURE

This disclosure relates generally to conference room automation systems and more particularly to a processor-based integrated movement sensor, lights, cameras and projector that senses and interprets human movement within the room to control the projector in response to that movement and that captures events occurring in the room.

BACKGROUND

This section provides background information related to the present disclosure which is not necessarily prior art.

The conference room in most office environments will typically have a projector equipped with an analog video (VGA) connector, or sometimes a digital video connector, designed to be plugged into a user's laptop computer during the meeting. Control and use of the projector is strictly a manual operation. A user must physically plug his or her laptop into the projector, lower the room lights using conventional wall-mounted controls, point the projector at a suitable wall or projection screen, adjust the tilt angle of the projector, and focus. If another presenter wishes to project information from his or her laptop, the first laptop must be disconnected, the second laptop plugged in. If it is desired to project onto a different surface than originally selected, the projector must by manually moved.

SUMMARY

This section provides a general summary of the disclosure, and is not a comprehensive disclosure of its full scope or all of its features.

The disclosed apparatus, which we refer to herein as the SmartLight interaction system, offers a substantial improvement over the conventional conference room projector. The SmartLight interaction system (also referred to herein as "SmartLight" or "SmartLight System") integrates lighting, sound, projection, and sensing capabilities to enable new collaboration, communication, and interactivity experiences. SmartLight provides a platform that can be amplified by third-party developed applications and hardware add-ons, and can create a new business ecosystem. Such ecosystem has the potential to provide far more utility and value to consumers.

The SmartLight system provides tight integration sensing, visual projection, audio input output, lighting, wireless computing and robotics in a compact form factor, and gives users new experience with augmented, just-in-time projected information, object scanning, audio I/O, and gestural user interface. It dynamically augments the environment and objects with media and information, with seamless connection with laptops, mobile phones, and other electronic devices. It transforms surfaces and objects into interactive spaces that blend digital media and information with the physical space. Potential application areas include business, education and home.

In one embodiment the SmartLight is adapted for a business meeting room environment. The embodiment offers a new interactive meeting experience with enhanced communication, collaborations and sharing.

For the business environment, the advantage of SmartLight is that it is a compact self-contained module compatible with standard ceiling fixtures and can be seamlessly integrated into meeting rooms, while at same time, it provides the following features in addition to standard lighting:

- Smart projection to any surfaces in the room;
- Adaptive smart LED lighting;
- Occupancy sensing, user seating sensing, user identification, gesture sensing;
- Document scanning, taking high resolution image of objects and writing;
- Directional audio recording and playback;
- Plug-and-play of user's personal computer and mobile devices The disclosed technology thus provides innovations at three levels:

- Hardware design of customized sensing, projection and lighting;
- Software design for intelligent interpretation of sensory inputs, and autonomous control of sensing and audiovisual outputs;
- Platform design for customizability, flexibility and creating an open, collaborative ecosystem.

Therefore, in accordance with one aspect, the SmartLight interaction system comprises an integrated case adapted to be installed in a room or within a defined space. At least one sensor is disposed within the case that detects human movement within the room or space. A display device, such as a projector, is disposed within the case and is responsively coupled to said sensor. A processor coupled to the sensor is programmed to interpret sensed movement and to control the projector in response to human movement within the room or space. Alternatively, a TV or other display devices having some components disposed within the case may be used.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 is a perspective view of the SmartLight apparatus installed in the ceiling of an exemplary conference room.

FIG. 2 is a perspective view of the conference room, with the SmartLight apparatus installed, showing how projection is effected.

FIG. 3*a* is a side view of a ceiling-suspended projector mounting apparatus;

FIG. 3*b* is a front view of the ceiling-suspended projector mounting apparatus of FIG. 3*a*.

Corresponding reference numerals indicate corresponding parts throughout the several views of the drawings.

DESCRIPTION OF PREFERRED EMBODIMENTS

Figure 4A:
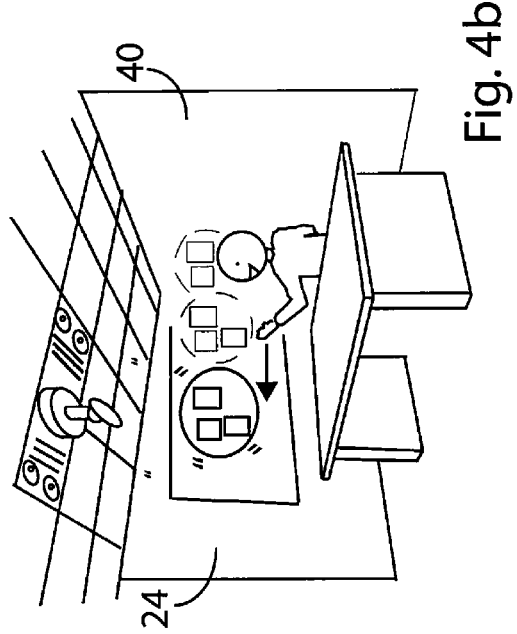
FIGS. 4*a*, 4*b* and 4*c* are exemplary use cases of the SmartLight apparatus.

Example embodiments will now be described more fully with reference to the accompanying drawings.

Hardware Design

In one embodiment a ceiling-mounting structure is configured to fit within the space of a standard office ceiling tile and is designed to support the system weight and to house control electronics and computer. Shown in FIGS. 1 and 2, an embodiment of the system comprises a pan, tilt and roll robotic base 10 that actuates a payload composed of various sensors and projectors. The payload is connected via cables to a stationary computation unit concealed above the ceiling 12. Also on a stationary support are sensors and actuators that do not need to move with the projector (e.g., speakers 14, LED lights 16, microphones 18). Required connections to the outside world are power and data (wired or wireless). In one embodiment the projection system comprises one or more hybrid laser/LED projectors for digital information projection. The lighting system may be implemented using programmed LED lights with electronically adjustable orientation capability to provide context-aware adaptive lighting.

In one embodiment the audio input output system comprises a pair of 1D microphone arrays. Working together, these arrays can record surround audio and implement 2D beam forming. The speakers are powered using Class-D amplifiers to provide high quality audio information to the room occupants with minimal weight and minimal heat dissipation.

The base 10 also incorporates an optical sensing system comprising one or more electronically controlled still and video cameras 19 for capturing images from within the room. The base also includes at least one pair of depth sensors 21 for room occupancy and interaction sensing as will be described. For example, the still camera can be a high resolution still camera (e.g., 10 mega pixel, 10× optical zoom) selected to have sufficient resolution for on-demand document scanning and image taking.

Although many different pan/tilt and roll robotic base configurations are possible, FIGS. 3a and 3b show one embodiment where the projector 20 with projector lens 22 is suspended from a ceiling-mounted platform using an ensemble of rotary units that permit movement of the projector up-down, panned side-to-side, and if desired tilted to true up the image with the projection surface, such as projection surface 24 in FIG. 2. In other words, the robotic base effects movement in the yaw, pitch and roll dimensions under the control of electronically controlled motors as at 26, 28 and 30.

The camera, depth sensor and the projector are mounted on a close-loop, servo-controlled robotic arm which supports pan/tilt motion. It enables on-demand projection, user interaction sensing and image taking toward any area of the room. A small computer, such as a Mac Mini, serves as the controller of the whole system. It wirelessly communicates with other personal devices in the room and with the Internet to support interaction with personal devices, and integration with cloud services.

As illustrated in FIG. 2, the projector 20 projects an image on surface 24. In this case the projected image includes an image of an analog clock 32 as well as textual information 34 and graphical or video information 36. As will be further explained, the robotic base can rotate the projector so that it projects its image down onto a suitable table surface 38 below, or onto another wall, such as wall 40.

Some of the basic use case scenarios of the robotically controlled projector and associated components are as follows.

Assisting Meeting and Collaboration

Shown in FIG. 4a, the meeting participants are standing at a projection table surface. The projector has been robotically controlled to project an image onto the table surface. Using the embedded depth sensors and cameras, the system identifies participants and tracks their body positions relative to the projection surface. A 3D audio/video meeting recording is captured by the microphones 18 and cameras 19 and this recording is digitally saved for later playback through the projector 20 and speakers 14, if desired. The system is further able to digitally process the captured images and sound (speech) and generate an automatic transcription that can be searchable for archive creation. The cameras may also be used for object and document scanning.

The system can also augment the traditional multi-site videoconference scenario (project interactive documents on table and participants at various positions on the wall, create a multi-site interactive whiteboard with "virtual participants" from other locations, generate private "close-captioning" for each participant depending on their language settings). If desired, the system can effect intervention into the meeting dynamic by suggesting speaker turns and by directing phases and output.

Finally, the system can help with space and time management, by projecting an overlay of the meeting agenda onto the projection surface (such as below the projected clock in FIG. 2 as at 34). This can help with starting and conducting the meeting in an organized and timely fashion. During the meeting the system can project an overlay of time indicators, onto the meeting presentation or via other sensory reminders to show the progress of time allocated for the meeting.

Natural Presentation

Figure 4B:
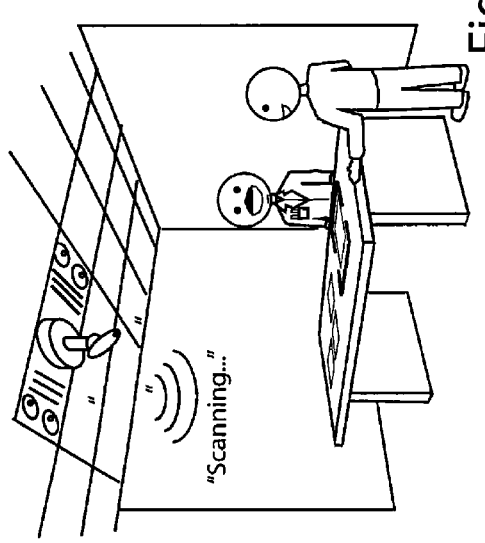

Shown in FIG. 4b, the system allows the meeting presenter to convey information naturally, as the system automatically anticipates and tracks the presenter's motion. Thus the system automatically identifies the projection surface(s) of interest based on shape and color attributes, for example. The system automatically identifies presenters and participants, noting head positions, and then prevents light from shining in people's eyes or on an unwanted surface. The presenter uses natural gestures and voice to control the presentation (i.e., the projector and material being projected therefrom) and all surfaces are rendered interactive by the system monitoring the presenter's gestures as he or she presents. In FIG. 4b, the presenter is shown moving his or her hand in a lateral gesture, which the system interprets as a command to move the display from projection upon wall 40 onto wall 24. This allows the presentation to be moved to any location within the room, based on a user's demand or alternatively based on fully automated commands issued from the system.

If a user wishes to share a document during the meeting, the system facilitates this through wireless user interface (UI) sharing, wireless display sharing and cloud-based content sharing and rendering. Content can be retrieved and displayed automatically once the presenter has been identified by the system.

Augment Digital with Physical, Augment Physical with Digital

Figure 4C:
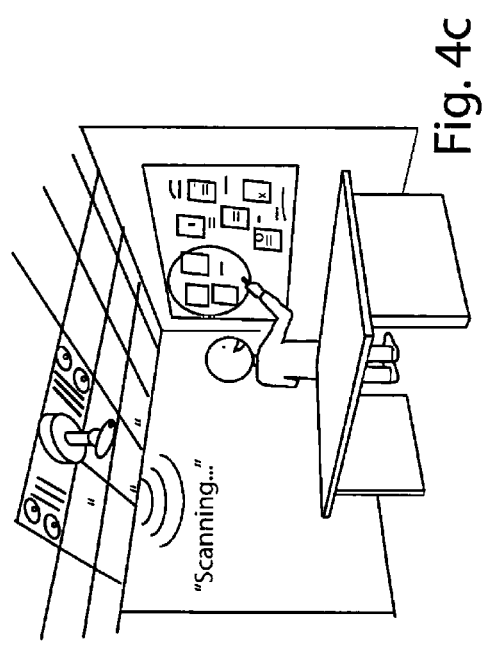

Shown in FIG. 4c, the system allows a presenter or user to augment projected documents as well as physical documents. This is accomplished, for example, by using a physical pen to annotate a projected document. For example, if the projection surface is a writeable whiteboard, a dry felt marker can be used to annotate the projected document, as shown in FIG. 4c. Physical documents can also be scanned by the system, using the camera 19 and then digitizing the captured image. These digitized images can then be projected and electronically augmented as discussed above.

The system supports the display and management of multiple layers of recorded documents and writing (annotation), where layers of physical writing may be placed on top. The user can also manipulate digital content with freehand gestures, including using touch gestures on surfaces. The system can also embed voice notes or other hyperlinks in the captured content.

Software Technology

The software system is a key enabler of the SmartLight with intelligent sensing, adaptive augmented projection and user interactivity. The software architecture encapsulates a large number of sensing and controlling technologies, makes multiple components work seamlessly together, and provides an abstract yet powerful interface to the application layer. The architecture employs advanced aggregated sensing and controlling algorithms for variety of input and output devices.

Software Architecture

Figure 5:
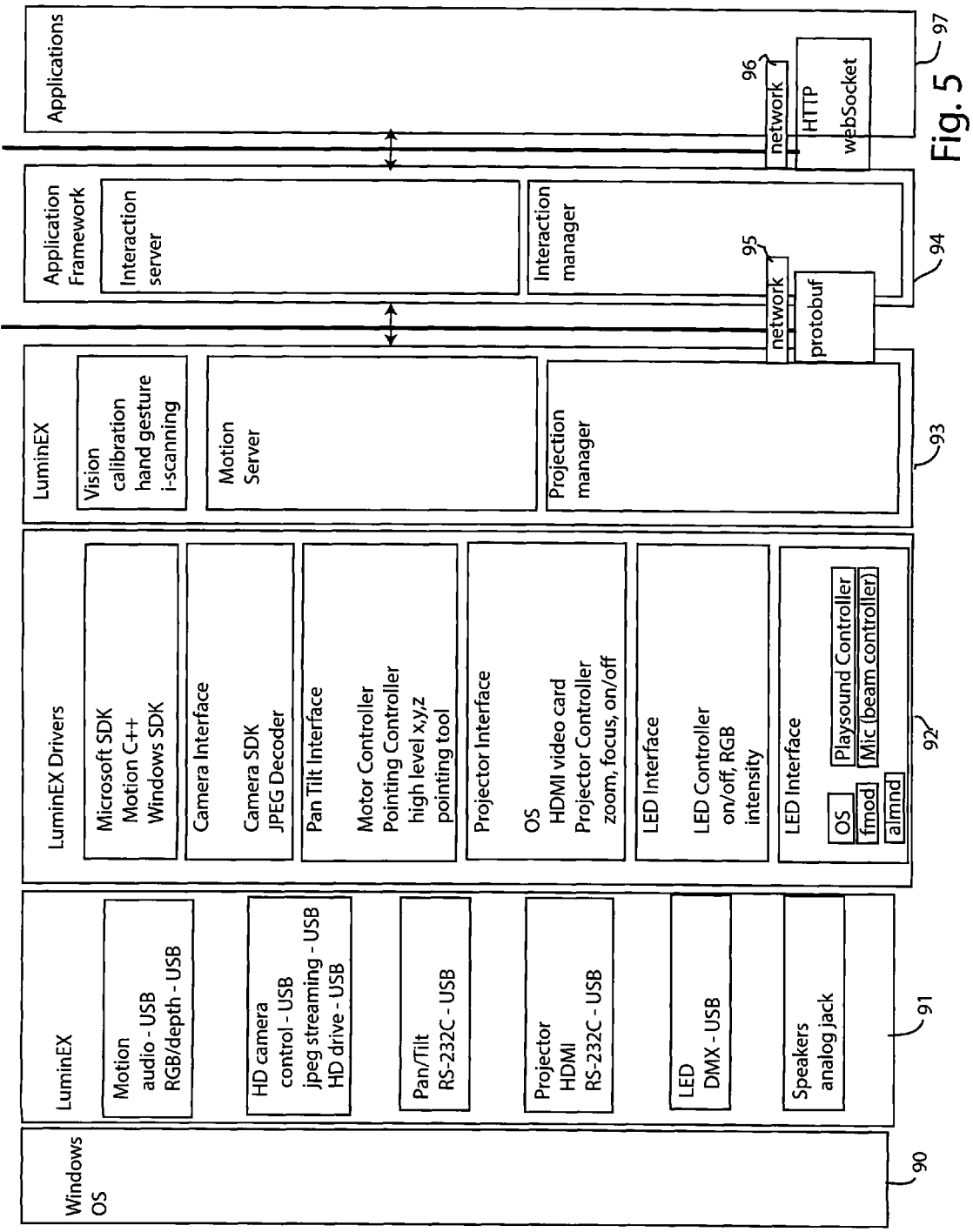
FIG. 5 is a software architecture diagram illustrating one embodiment by which the processor is programmed to perform the SmartLight apparatus functions disclosed herein.

The software architecture is based on layered design. The benefit of this design is to give the system high portability on different hardware components, greater flexibility on processing algorithms, and allow developers to easily develop powerful applications. From a physical application standpoint, the layered design is shown in FIG. 5. As illustrated there, the processor within the SmartLight operates upon software loaded into the attached memory of the processor. The software includes an operating system; the Windows operating system 90 has been illustrated in FIG. 5 by way of example. Added to the basic core Windows operating system functionality are a set of input/output driver software algorithms 91, to support communication with the various devices, such as the motion sensing device, the high definition (HD) camera, the robotic pan/tilt mechanism, the projector, the LED lighting, the audio system (speakers) and the like. Associated with these driver algorithms are a set of drivers 92 that are designed to define the physical interface with the aforementioned devices.

Running on the operating system as an application or set of applications are the functional application algorithms 93 to support vision systems, motion server systems and projection management. The vision system, for example, includes algorithms that allow the system to be calibrated to a particular room environment and then to perform hand gesture recognition, face recognition, and other intelligent scanning operations.

The software architecture illustrated in FIG. 5 is also configured to support networked connections to other systems. This networked connection capability allows the SmartLight system to define a customizable platform which third parties can add to. Thus the architecture includes an application framework layer 94, connected by network 95, that is architecturally subdivided into an interaction server and an interaction manager. The interaction server supports communication with applications 97 running on another system, such as on another server either within the local area network 95 associated with the SmartLight or within the Cloud (Internet based server on an external network 96). The interaction manager supports the interaction functionality whereby applications running on another system are able to use the interaction resources provided by the SmartLight platform. The networked connection between the algorithm layer 93 and the application framework layer 94 may be implemented using a suitable protocol, such as the protobuf protocol. The networked connection between the application framework layer 94 and the application layer 97 may be implemented using the HTTP protocol, and/or webSocket protocol, for example.

Figure 6:
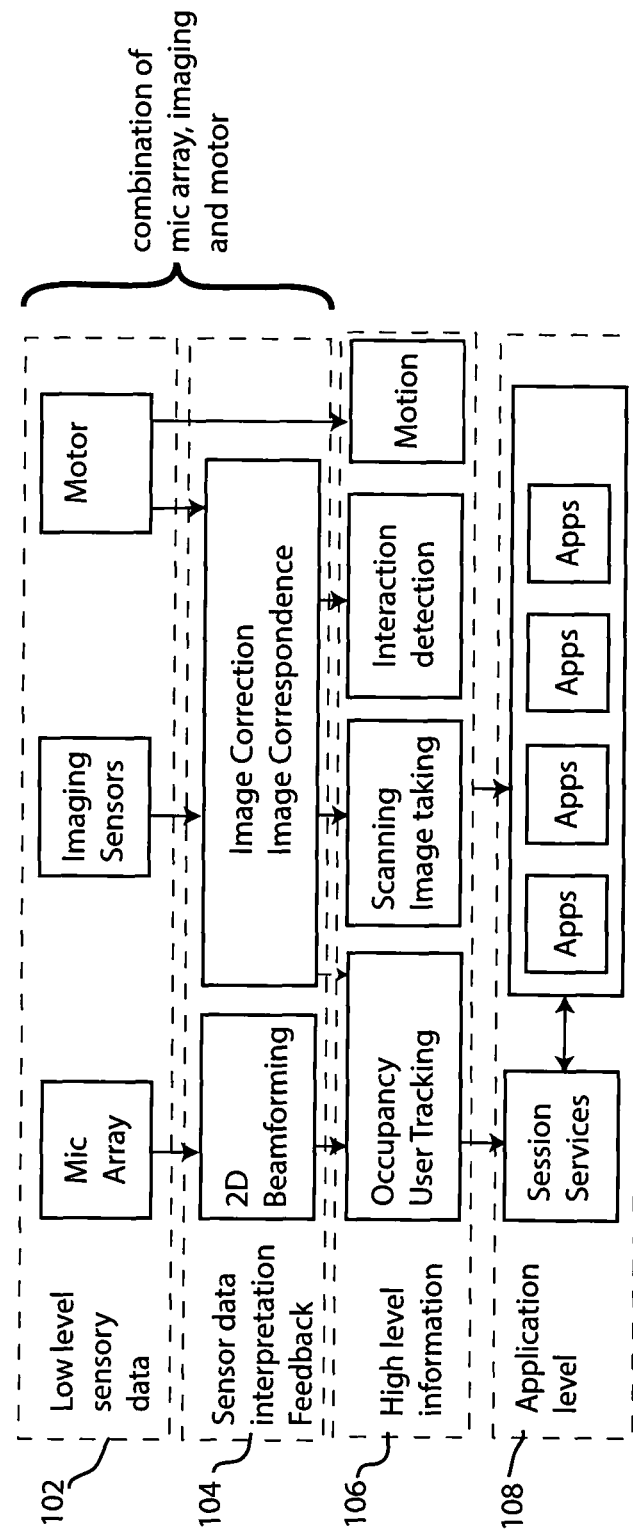
FIG. 6 is a software and hardware architecture diagram showing how data are passed between different levels of the architecture.

From sensing perspective, shown in FIG. 6, the lowest layer 102 is the abstraction of the raw sensors and retrieval of raw sensor data. The next layer 104 is the algorithms that interpret and fuse the info from different sensors. The next layer 106 contains algorithms that generate high level information, e.g., gesture detection. The highest level 108 is the system management and applications/GUI.

Figure 7:
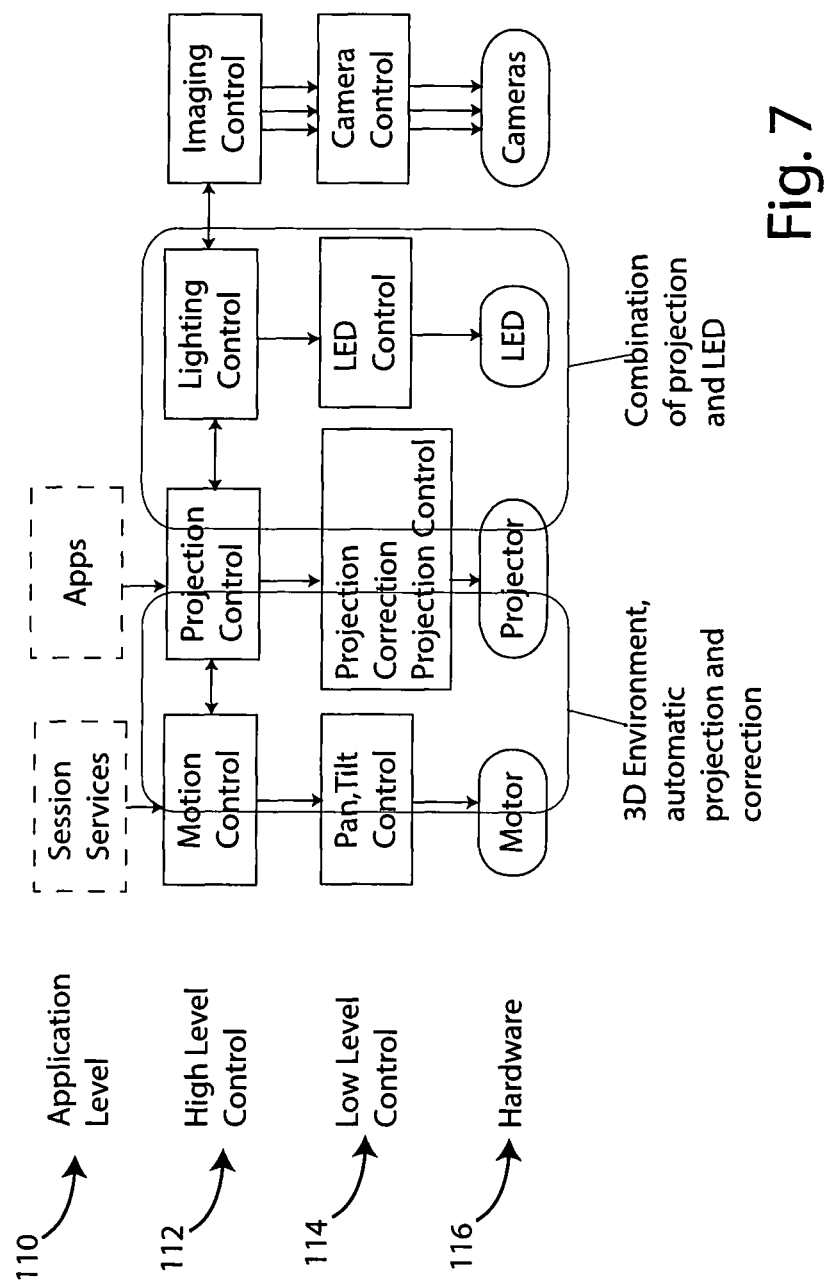
FIG. 7 is a software and hardware architecture diagram showing how control and feedback is passed between different levels of the architecture.

From control/feedback perspective, shown in FIG. 7, The highest layer 110 is system management and applications. The next layer 112 is high level control modules that take high level commands from the applications, and use algorithms to generate low level control commands for the next layer, the low level hardware control level 114. The hardware control level 114, in turn, feeds the hardware layer 116. The hardware layer 116 occupies the lowest layer and serves as the interface to the native hardware.

Key Algorithms

The SmartLight is an autonomous projection, sensing and interaction system. This poses great challenge to the software algorithms, because the SmartLight needs to be able to turn to any target location, project onto any surface in the room with projection corrected rendering. The software algorithms enable it to sense user interaction and capture images at any location with high precision.

Robotic Control Algorithms

Figure 8:
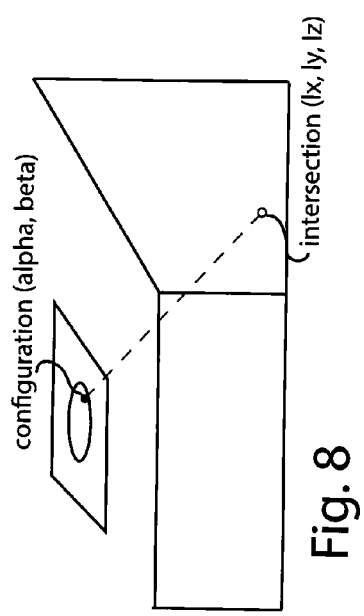
FIG. 8 is a perspective view of a room showing geometric relationships useful in understanding the robotic control algorithms.

The robotic control algorithm employs an inverse kinematic algorithm that is applied to solve for motor position by finding the Jacobian and then using Newton's method to solve the kinematics equation. In this way, the robotic control algorithm is able to direct the projection to any point in the 3D space. FIG. 8 illustrates this.

Projection and Imaging Correction Algorithms

Figure 9B:
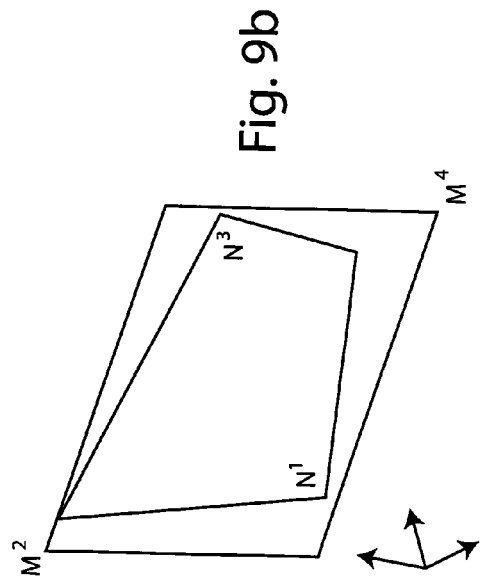
FIGS. 9a and 9b are graphical representations useful in understanding the projection and imaging correction algorithms.
Figure 9A:
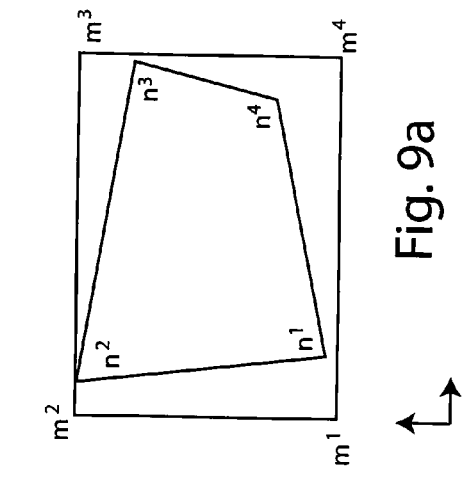

Because the projection direction is dynamic and toward any surface in the room, standard projector keystone control is not suitable. The SmartLight thus employs a custom keystoning calibration algorithm and projection correction algorithm for OpenGL rendering. In this regard, FIGS. 9a and 9b show how points in an image in projector space (FIG. 9a) are translated into points in screen space (FIG. 9b).

The method requires marking of 4 calibration points on the surface, and calculating a 3×3 homography matrix H by minimizing back-projection error:

$$s_i \begin{bmatrix} x'_i \\ y'_i \\ 1 \end{bmatrix} \sim H \begin{bmatrix} x_i \\ y_i \\ 1 \end{bmatrix} \sum_i \left( x'_i - \frac{h_{11}x_i + h_{12}y_i + h_{13}}{h_{31}x_i + h_{32}y_i + h_{33}} \right)^2 +$$

$$\left( y'_i - \frac{h_{21}x_i + h_{22}y_i + h_{23}}{h_{31}x_i + h_{32}y_i + h_{33}} \right)^2$$

Figure 10:
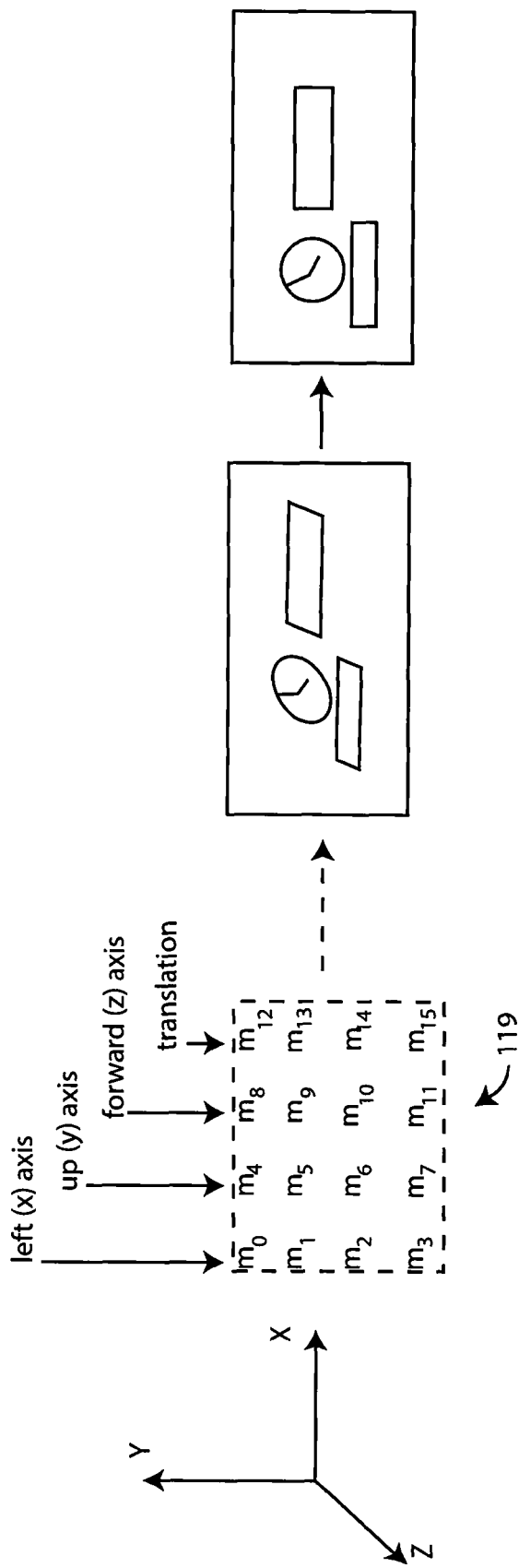
FIG. 10 is a graphical representation of the homography matrix used by the projection and imaging correction algorithms.

Then, as shown in FIG. 10, a 4×4 OpenGL transformation matrix 119 is derived from this homography matrix. By applying this OpenGL matrix in the rendering pipeline, the algorithm can correct any 2D or 3D rendering.

The direction of each still camera is also dynamic. Similar calibration algorithm is developed, and image warping algorithm using the homography matrix to correct the images.

Intelligent User Detection and Interaction Algorithms

The intelligent user detection and interaction algorithm detects if a user enters the room, which seats are occupied by other users, and also the user's hand gestures. The occupancy detection algorithm is based on the total volume change in depth image. The user seating detection is based on advanced image processing including threshold depth volume change in the seating area, blob finding, and likelihood matching. Hand interaction tracking is based on advanced image processing including background estimation and subtraction, blob finding, and blog tracking.

At the end of this document, see the exemplary source code appendix showing how interaction by gesture is handled by displaying projected "buttons" on any surface. The processor is programmed based on the disclosed source code, causing it to respond to user gestures that mimic the pressing of projected "buttons" on a surface, such as a tabletop surface. This capability would allow, for example, each user seated at a conference room table to check into the meeting and make meeting choice selections, such as choosing which native language the user prefers when text documents are displayed in front of him. Of course, the uses of such virtual buttons are numerous and the above is intended as merely one example.

Directional Audio Recording

The goal of the directional audio recording algorithm is to record 3D surround sound audio, and detect the identity (position) of the speaker. The algorithm combines the data from two 1-D microphone arrays to generate 2D sound direction info.

Platform Technology

Figure 11:
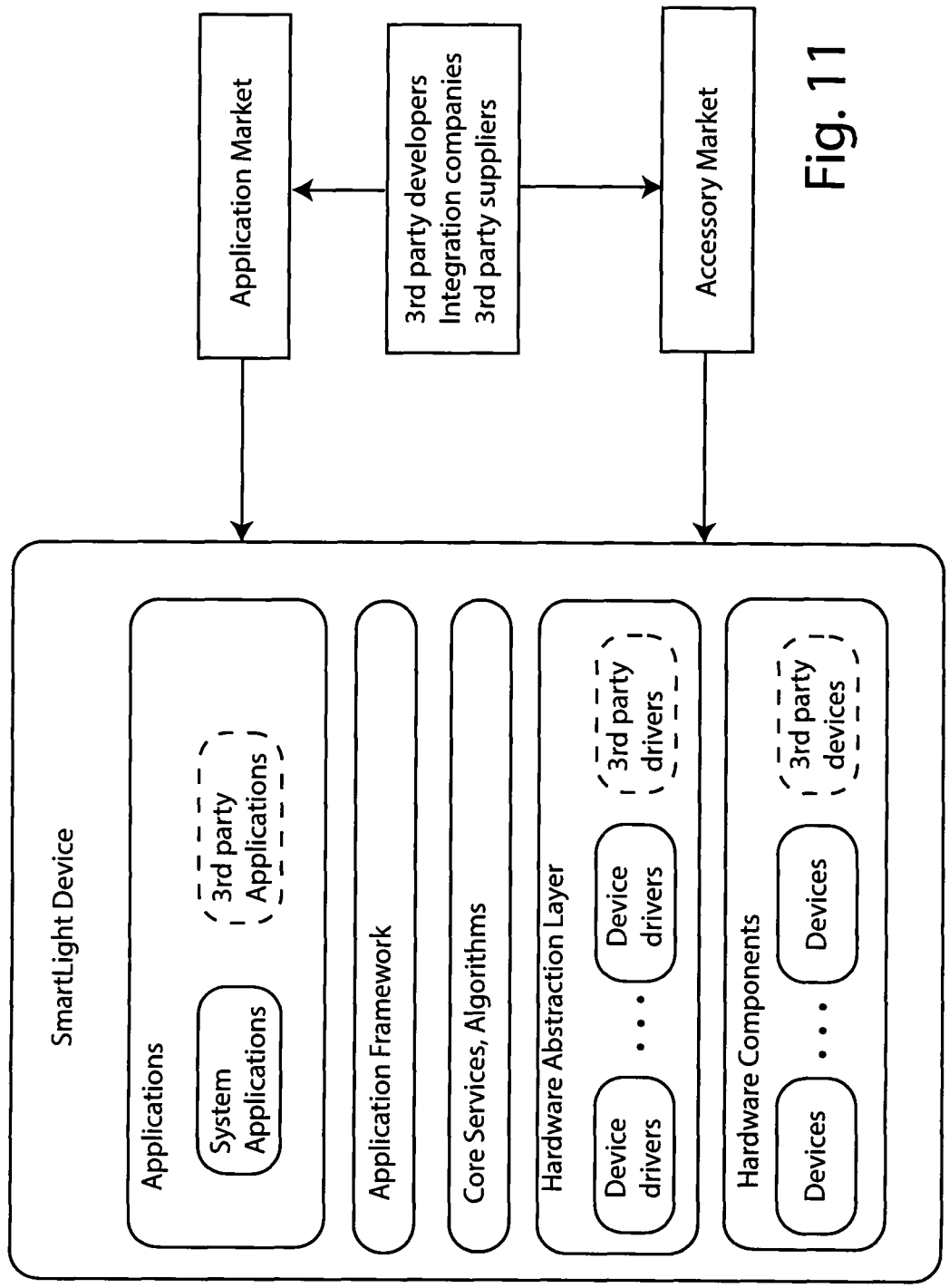
FIG. 11 is a block diagram illustrating an exemplary SmartLight platform embodiment.

As illustrated in FIG. 11, the SmartLight device provides a platform that supports third party applications and accessories, which may be added to provide additional features or enhanced functionality. Thanks to its clean, layered design, new applications and new hardware components can be added to fit a user's need. In this regard, there are three main components of the platform: SmartLight device, the application market, and the accessory market. The application market helps third party developers to develop, contribute and distribute new applications. The accessory market helps third party suppliers and developers to create new components and distribute them.

User Interaction, User Interface, Use Case Scenarios

Figure 12:
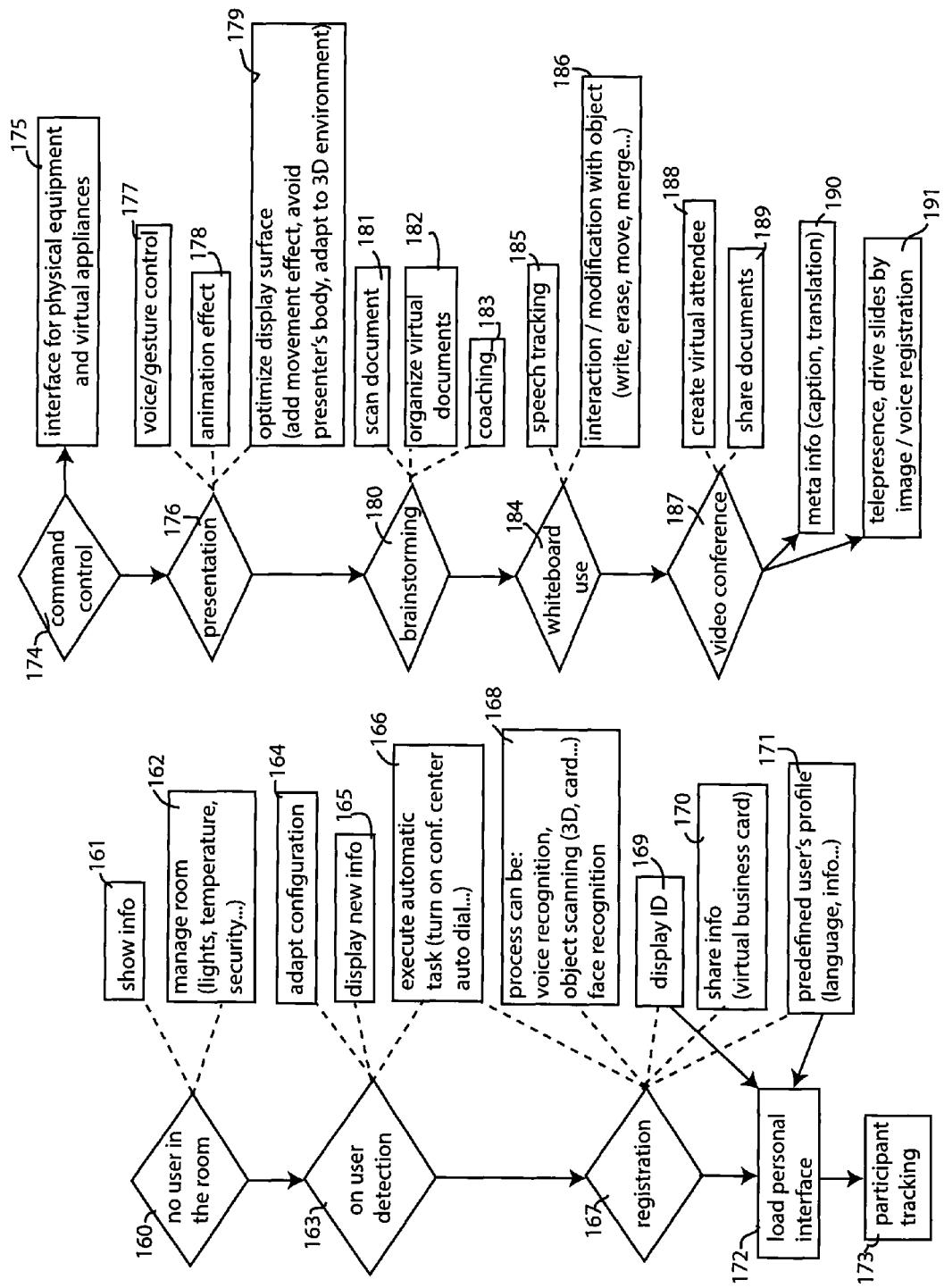
FIG. 12 is a flowchart detailing the manner of user interaction with the SmartLight system.

FIG. 12 provides a block diagram detailing how user interaction is performed. When no one is present in the conference room [step 160] the SmartLight shows information on a screen [step 161] so that it is visible, for example, through the open door. In this way passersby can see what schedule is associated with that room. The SmartLight also manages room environment conditions, such as lights, temperature, security and the like [step 162].

Upon detection of a user entering the room [step 163] the configuration is adapted to take into account that the user has entered [step 164], new information may be displayed on the screen to welcome or instruct the user [step 165] and certain automated tasks may be commenced, such as turning on the conference center system, autodialing a conference meeting number, or the like [step 166].

Typically, users will register with the SmartLight system [step 167] which may be done by a variety of means, such as voice recognition, face recognition, or scanning a 3D object or ID card [step 168]. The user's ID may be displayed on the projected screen [step 169]. If desired, the system can share information with others during the registration process. This can include sharing virtual business cards among participating conference members [step 170]. The entire registration process can proceed in the user's chosen natural language [step 171], based on the user profile stored within the SmartLight system. Thus if a participant is a native Japanese speaker, his or her information will be presented in the Japanese language. Other participants may simultaneously use other languages. Each user's profile may also be used to load a personal interface for that user [step 172]. These personal interfaces may be projected onto the table in front of where that person is sitting. If the user moves to a different location, the SmartLight tracks the user's location [step 173] so that the personal interface may be kept current no matter where the user happens to move.

The SmartLight responds to control commands [step 174] which may be effected by hand gesture, by voice, by keyboard, by pointing device entry, or by touch interface manipulation, for example. These control commands serve as the interface for physical equipment as well as virtual appliances within the conference room [step 175].

Conference rooms can serve various functions, such as giving presentations to an audience [step 176], brainstorming [step 180], using a whiteboard located in the room [step 184], or video conferencing [step 187]. The SmartLight facilitates each of these different uses as illustrated in FIG. 12. Thus presentations may be enhanced using SmartLight by responding to the presenter's voice or gesture control [step 177], by producing animation effects of a projected image [step 178] and by optimizing the display surface [step 179]. Such optimization may include adding animation or movement effect to a projected presentation, or by automatically moving the placement of a projected image to avoid the presenter's body. The SmartLight will also adapt to different 3D environments automatically. Thus if objects are moved within the room, the presentation position is automatically adjusted.

Brainstorming is enhanced by the SmartLight by allowing participants to readily scan documents [step 181], to organize virtual documents [step 182] and to provide coaching [step 183] by projecting preprogrammed coaching instructions to help the participants think through all of the pending issues or even to "think outside the box."

Whiteboard use is enhanced by the SmartLight by tracking or linking speech to the images as they are drawn upon the whiteboard [step 185]. The video image of the whiteboard images as they are created is captured along with the speech, and the speech may be digitized and converted into searchable text using a speech recognizer. This facilitates later search of the spoken content of the whiteboard session. Objects may be projected onto the whiteboard, and through gesture interaction, these objects may be modified, by writing annotations on them, erasing annotations previously written, moving or relocating content, or merging previously generated and projected content with content newly added while drawing on the whiteboard [step 186].

Video conferencing is enhanced by the SmartLight in several respects. The SmartLight system can create a virtual attendee [step 188]: an attendee who is not physically present in the room but who is made to appear present by projecting an image of the person into the meeting room space. This virtual attendee can, for example, share documents with other participants [step 189]. Metadata information, including captions and translations may be captured as part of the data captured by the SmartLight system [step 190]. If desired, the SmartLight system can itself be a "participant" in the meeting, generating content seen by the other participants. This added content can be triggered or mediated by the movement (images) or voice commands from the other participants, or by other preprogrammed means [step 191].

User Detection, Registration and Tracking:

SmartLight is able to enable rich interactions, enhance collaborations and improve telepresence. In this regard, one issue with the current conference room experience is lack of context and personal information: who's who? where are my documents? who said what in the meeting? SmartLight addressed these issues by applying sensing and intelligent projection on the meeting table.

When the conference room door opens, SmartLight automatically lights the room and projects a meeting agenda onto the table or the wall. It detects where a user is seated and allows a user to register, using touch interaction and voice commands, or RFID. After the user is identified, personal documents and system controls are displayed close to the user. For example, SmartLight may display the last meeting actions and the user can use a hand gesture to open that document. SmartLight also communicates with user's personal device for identification, to augment a personal device, and let a personal device to augment the SmartLight.

Digitize, Augment, and Collaborate:

Among the key tasks and pain points of the typical business meeting is how to digitizing physical documents or objects, how to digitize and share user's writings, and how to collaborate on digital information.

SmartLight's high resolution imaging capability, multisurface projection capability and interactivity revolutionizes the collaboration experience. A user places an object or document on the table. SmartLight zooms to the object and takes a high resolution image.

In another aspect, SmartLight displays an image on the table for focused discussion. A user can use hand gestures to move the projection to the wall for high resolution display. The user can then write on the wall to annotate the image. SmartLight tracks who is writing on the wall. A user takes an image of the writing layer and shares it. If desired, a user may erase the writing, write again, or capture the image again. Each of these changes is saved as a separate layer. All layers are recorded. By saving layers in this fashion, users can then modify documents and layers using hand gestures. The full meeting session is recorded as 3D video and 3D audio for future playback.

Teleconference/Video Conference:

Current teleconference systems require a number of devices, which are hard to set up, complex to operate, and require space on the meeting table. As one self-contained ceiling-mounted unit, SmartLight provides all the features of an A/V telecom system. It needs zero configuration and leaves the table clean. With SmartLight a teleconference or video conference proceeds like this.

Users enter the meeting room, and an A/V connection with remote sideshow automatically starts, using the cloud connectivity of SmartLight and the information retrieved from the room booking schedule.

The projector projects video stream on the wall, and the speakers and microphone array serves audio communication. The projector also projects a virtual communication control pad (showing buttons such as 'mute', 'end meeting', 'share document'). Any user can use hand gestures to interact with these projected buttons. This eliminates the need of physical controllers.

Detailed User Interaction, User Interface, Use Case Scenarios

With FIG. 12 in mind, the scenarios below try to showcase some of the main features of the developed concept in the setting of a meeting room. SmartLight is capable of:

Exploiting its situation awareness (who speaks, what is said, link information to source . . . ) for triggering an action according to the type of event detected (people entering the room, meeting starts, registration . . . ), Capturing and digitalizing object to create digital interactive copies (scanned document can be annotated, saved, and transferred over the network), Turning any surface into a display, Displaying contextual information when the projector is not explicitly used, Recording and replaying audio, Projecting on objects to allow for new scenarios such as turning a simple foam model into an interactive product prototype with a mock-up interface, Situation Awareness:

Thanks to its sensors, the SmartLight can detect the presence of a user, register the user (explicitly) or identify the user (transparently), and keep track of his or her activities.

The registration process can be done by any process that identifies the user (speech recognition, face recognition, object . . . ) using biometric discriminative data sets previously recorded in user profiles, or using non-biometric data such as badges (with RF, magnetic, or optical markers) or passwords.

The information is collected directly by the SmartLight when possible or via a wireless accessory if needed (e.g., badge reader). Several identification/authentication methods can be used in complement to one another. One example below shows how one could use a personal device to snap the picture of a QR code containing session information and projected on a surface of the room at the beginning of a meeting. Registration can also be performed semi-automatically by having the SmartLight emit a signal (auditory outside the human audible spectrum, light (visible spectrum or not), or RF) that is localized to the room and captured by sensors on the personal devices. The simplest mechanism would involve people logging in to backend through the network (to identify themselves) and then entering a code displayed by SmartLight to verify their actual presence in the room.

One example below illustrate the use of business cards put down on the table surface to identify users (if authentication is not required). If the identify of all users in the room can be accurately determined, then the system can automatically select the content that should be made accessible during the meeting based on each user's respective access rights.

Users are tracked as they moved around the room using the depth sensor/RGB camera/3D audio capture. The corresponding information is added as a metadata stream to the meeting audio visual recordings and used in real-time to personalize the interactive interfaces projected in the vicinity of each user.

The attendees' information can be used to label the audio transcription such as in the example below. In a similar fashion, all artifacts brought to the meeting can be traced back to their original owner/presenter.

Meeting Assistant:

SmartLight can identify the type of meeting from the original meeting invite and from the analysis of the meeting dynamics (activity of the participants, frequency of speaker turns, amount of slides projected, amount of content written, use of telecommunication facilities). This information is in turn used by SmartLight to assist meeting participants by suggesting specific tasks to the participants based on time and meeting progress, i.e.:

- SmartLight keeps the meeting agenda and remaining time for all to see as part of the projected content
- When the remaining time is low, SmartLight will visually and audibly notify the participants
- If no action item or other essential meeting output has been captured yet, SmartLight can remind the attendees of the importance to remedy the issue in the time remaining
- SmartLight can identify attendees with low participation and encourage them to take the floor and express their opinion
- SmartLight can identify when the discussion is running away from the main topic and try to keep the meeting on track
- SmartLight can display a small "prompter screen" on the wall opposite of the presentation wall for the speaker to access important information (presentation notes, timer, voice volume in decibels, audience estimated arousal level), since the attendees will be very likely to glance in that direction Room Inventory:

SmartLight can track specific assets in the room and prevent objects from being removed from the room, identify misuse & abuses, or suggest help when users seem to experience operation issue with a given device. Thus SmartLight can check that the (whiteboard) walls have been cleared of markings when people exit the room, and that the room has been left in a clean state.

Digitalize and Manipulate the Objects

Using the SmartLight, any object can be digitalized and digital copies made instantly available in the same room or at a distant location. For example, in order for all people seating at a table to look at the same paper document, a digital copy is made by SmartLight and automatically presented to each participant with the correct orientation (and possibly proper language using automatically translation if the preferred reading language of the user is known by the system).

That digital copy may then be manipulated (modified, uploaded to a Cloud service and shared with participants): either through digital interaction (enabled by the SmartLight sensors and hyperlinking to other digital content including audio-visual content), or through physical augmentation (ink, object, picture, post-it) in which case it can be digitized again using SmartLight's capture infrastructure.

SmartLight allows this process to be iterative (leading to the creation of content "layers") that can be individually retrieved, edited, and re-combined together. SmartLight also allows users to replay the editing process and retrieve intermediary versions of digital or physical edits (in a manner similar to revision control systems in the software development world).

Turn any Surface into a Display

The SmartLight can display on any surface and choose the best surface for each type of information. The depth sensor of SmartLight is used to identify surface types and their respective extents, whereas the RGB camera looks at color hue and uniformity. SmartLight can conduct projection tests to identify potential surface glares and to automatically adjust brightness/color in order to provide the best viewing experience to users (uniform color and brightness responses throughout the area). By default, the projection area is selected to be as planar as possible, though in certain scenarios the projection is made to map onto a selected object and the depth/RGB sensors are actively used to track the target surface in time in order to adapt the projection parameters accordingly. In all cases the depth sensor is used to correct the project perspective and present a rectified image to the users (software keystoning effect).

Surface selection will be impacted by user position as well (to avoid having users look too far on the side). If the projection is 3D, SmartLight will select the best surface and projection parameters to guarantee the best 3D effect to all (by reducing the viewing angle spread between users to the minimum).

Depending on the room configuration, the number and position of users, and the projection area location, SmartLight will automatically adjust the projection brightness and the room ambient light (which can be refined based on the detected participant activity, e.g., if they are taking notes, typing on their laptops, or watching the projected image. Local "reading lights" can be provided to each participant as well by SmartLight and those can adapt to the context, e.g., if the user is reading his laptop screen vs. pulling out a sheet of paper that required more secondary lighting).

Table top projection is an important differentiator of SmartLight in contrast to traditional meeting room projection system. In combination with the depth/RGB sensor enabled interactivity, a wide range of new scenarios are made possible, for example:

- Presenting virtual digital copies of paper documents or other artifacts that resemble the originals but that can be annotated physically or digitally. Projection orientation can be corrected for each participant when presenting separate content for each attendee
- Presenting interactive maps, architectural plans, or other content that lends itself better to a horizontal representation
- Allowing direct collaborative tangible manipulation of slides or software code through physical or digital affordances
- Carrying out training sessions with virtual objects with which participants can naturally interact If nobody is in the room, SmartLight displays useful information (next meeting schedule, time and date, weather . . . ). This information can be projected, for instance, on the door/sidelight/wall of the room and is visible from the outside if the door/sidelight/wall are made of a material suitable for back projection (frosted glass, for instance).

Smartlight can generate contextual personal interactive display zones on demand. For instance, presenting an open palm towards the ceiling and realizing a particular gesture could trigger SmartLight to create a button interface directly in your hand to control various functionalities of the room such as the teleconference system. Another example would be create a stack of virtual business cards of the other participants next to yours, a secondary display next to your portable device laying face up on the table, or a notification display on the back of your portable device if it is lying face down. Yet another example would be for the participants to be able to create an automatic closed-captioning display in front of them in the language of their choosing, with the option to seek back in time to review a topic, if needed.

The "display everywhere" feature can be advantageously used to enhance the experience of a presentation by adapting the projection surface to the content that is presented (having bar graphs coming straight out of a user's hands for instance).

Audio-Visual Recording and Replay

Meetings are automatically recorded using all sensor streams available in the system (including the 3D audio, 3D video, and high-resolution still pictures). The recorded content is augmented with higher level metadata resulting from initial analysis & interpretation of the data and from additional sensors (e.g., user information & location, audio transcript, document OCR, object recognition, meeting agenda, business card scans). Lastly, all explicit captured content from the meeting participants is added to the recordings (wall writing, document, or artifact pictures, projected content, voice annotations, meeting minutes and other digital notes).

The global pool of recorded content for each meeting constitutes a "meeting object" that is indexed and archived in a database that can be queried at a later time through a web interface or through the SmartLight system itself. SmartLight can identify the type of meeting from the original meeting invite and from the analysis of the meeting dynamics (activity of the participants, frequency of speaker turns, amount of slides projected, amount of content written, use of telecommunication facilities). This information is used to create a "digest" of the meeting that will allow participants as well as non-participants to quickly review the essential parts of the meeting. The digest contains all relevant bits of each stream stitched together (AV room capture, slides, scans, notes, closed captioning, speaker info). If the digest is played back on the SmartLight system itself, users can chose to "relive" the meeting where content, people, & artifact are projected in 3D video & 3D audio at their original place in the room. Machine translation can be applied at the request of the user on any spoken or written content. The indexing of the content allows searches across the entire database using simple keywords or semantically rich queries ("meetings about project X that included John and where we discussed industrial design").

Meeting objects for a particular project are automatically clustered together to allow for easy overview & analysis of the content generated during the project meetings as well as the progress of the discussions.

Audio Visual Enhancements:

to improve the sound acquisition, 3D source localization is performed by the microphone array which then can form a beam in the direction of the source in order to focus on a specific speaker. The depth and RGB information from the various sensors are combined to create a 3D textured mesh model that can be visualized in a 3D engine and therefore the point of view can be adjusted at playback.

Give Contextual Information:

SmartLight can add some information on top of an object giving some context information.

Virtualization of Person/Object to Interact with:

Any object can be virtualized and a UI can be proposed to the user (phone, remote controller, light button . . . ). In the context of a teleconference, SmartLight can display the digitalized image of participants.

Table-Top Installation:

The same contraption can be used upside-down on a table and enable most of the same use-cases, apart from the ones requiring projection on the table surface.

Multi-Unit Installation:

Several SmartLights units can be installed in the same room to provide additional sensing and actuation coverage, as well as improving sensing capabilities (higher resolution 3D, better audio positioning). The ability to project on more surfaces at the same time opens the door to new scenarios (e.g., documents on the table, remote participants on one wall, presentation on another).

3D Audio Playback & 3D Projection:

Audio spatialization is especially interesting in the meeting replay scenario mentioned above and in general when trying to place a virtual attendee in a specific position of the physical space.

Virtual Pen/Eraser:

If desired, one can define a virtual language for creating digital annotations on the projected content, or using real artifact as "props" that will be identified by the system and trigger a particular action (such as writing, erasing, emailing, capturing on picture).

Wireless Connection with any External Device (Laptop, Tablet, Smart Phone):

When connected to participants' personal devices, SmartLight can use the sensors, displays, and actuators from the personal devices to enhance the interaction, for example:

SmartLight uses microphones to capture better sound and improve sound localization SmartLight can use the device buzzer to attract attention from a particular participant SmartLight can use the device screen to display private or high-resolution content SmartLight can use the device camera to capture documents or participants' faces Other Types of Screens:

While projection screens and white wall surfaces are convenient for most conference room applications, other types of screens may be employed, including broadcasting the display image to a digital or analog monitor located in the room, or by streaming the display image to the screens of personal devices (laptops, tablets, smart phones) of participants in the room.

Combined with Laser Pointer:

If desired, a presenter may choose to use a laser pointer. The SmartLight system can track this laser pointer image and treat certain predefined motions as metadata commands, causing the projection to move or change in the same manner as if a hand gesture had been used as described above. Thus the laser pointer becomes another tool to move, reorganize or modify content projected during the meeting.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

The following source code explains how interaction by gesture is handled by displaying projected "buttons" on any surface.

DepthUtils.h

```
#ifndef __DEPTH_UTILS_
define __DEPTH_UTILS_ include <opencv2/opencv.hpp>

/// get total amount of difference between image and background. threshold is minimum distance
    float GetTotalDepthDifference( const cv::Mat_<unsigned short>& image, const cv::Mat_<unsigned short>& background, float threshold );

/// get the area size of different height total amount of difference between image and background. threshold is minimum distance
    size_t GetDepthDifferenceAreaSize( const cv::Mat_<unsigned short>& image, const cv::Mat_<unsigned short>& background, float threshold );

bool GetOccupancy( const cv::Mat_<unsigned short>& image, float threshold, float trigger );

/// benerate binary (0 or 255) mask of
    void GenerateDepthDifferenceMask( cv::Mat1b& mask, const cv::Mat_<unsigned short>& image, const cv::Mat_<unsigned short>& background, float threshold_in, float threshold_out );

#endif //__DEPTH_UTILS_
```

DepthUtils.cpp

```
#include "DepthUtils.h"

#include <ofDebug.h>

//---------------------------------------------------------------------------
    float GetTotalDepthDifference( const cv::Mat_<unsigned short>& image, const cv::Mat_<unsigned short>& background, float threshold )
    {
        float sum = 0;

for (int j=0; j<image.rows; j++)
        {
            const unsigned short* img = image.ptr<unsigned short>(j);
            const unsigned short* bkg = background.ptr<unsigned short>(j);
            for(int i=0; i<image.cols; i++)
            {
                // handle the 0 depth properly:
                if (img[i]==0 || bkg[i]==0) {            // ignore zero points
                    continue;
```

```
            }
            if ( (float)bkg[i] > (img[i]+threshold) ) {
                    sum += bkg[i] - img[i] - threshold;
            }
        }
    } return sum;
}

//---------------------------------------------------------------------------
size_t GetDepthDifferenceAreaSize( const cv::Mat_<unsigned short>& image, const cv::Mat_<unsigned short>& background, float threshold )
{
    size_t area = 0;

for (int j=0; j<image.rows; j++)
    {
            const unsigned short* img = image.ptr<unsigned short>(j);
            const unsigned short* bkg = background.ptr<unsigned short>(j);
            for(int i=0; i<image.cols; i++)
            {
                    if (bkg[i]==0) {    // handle the 0 depth properly:
                            if (img[i]!=0) {
                                    ++area;
                            }
                            continue;
                    }
                    if (img[i]==0) {    // handle the 0 depth properly:
                            continue;
                    }
                    if ( (float)bkg[i] > (img[i]+threshold) ) {
                            area += 1;
                    }
            }
    } return area;
}

//---------------------------------------------------------------------------
bool GetOccupancy( const cv::Mat_<unsigned short>& image, float threshold, float trigger )
{
    unsigned short min_value = 65535;
    float accumul = 0.f;

for (int j=0; j<image.rows; j++)
    {
            const unsigned short* img = image.ptr<unsigned short>(j);
            for(int i=0; i<image.cols; i++)
            {
                    if (img[i]==0) {    // handle the 0 depth properly:
                            continue;
                    }
                    if ( min_value > img[i] ) {
                            min_value = img[i];
```

```
                        }
                        if ( img[i] < threshold ) {
                                accumul += threshold - img[i];
                        }
                }
        }

//printf("Accumul = %012d Min depth = %u\n", (int)accumul, min_value);
        return trigger < accumul;
}

//---------------------------------------------------------------------------
void GenerateDepthDifferenceMask( cv::Mat1b& mask, const cv::Mat_<unsigned short>& image, const cv::Mat_<unsigned short>& background, float threshold_in, float threshold_out )
{
        for (int j=0; j<image.rows; j++)
        {
                const unsigned short* img = image.ptr<unsigned short>(j);
                const unsigned short* bkg = background.ptr<unsigned short>(j);
                unsigned char* msk = mask.ptr<unsigned char>(j);
                for(int i=0; i<image.cols; i++)
                {
                        if (bkg[i]==0 || img[i]==0) {           // handle the 0 depth properly:
                                if ( bkg[i] != img[i] && img[i] != 0) {
                                        msk[i] = 255;
                                } else {
                                        msk[i] = 0;
                                }
                                continue;
                        }
                        if ( bkg[i] - threshold_in > img[i] && img[i] > bkg[i] - threshold_out ) {
                                msk[i] = 255;
                        } else {
                                msk[i] = 0;
                        }
                }
        }
}

TableView.h
#ifndef __TABLE_VIEW_H
define __TABLE_VIEW_H include "Stage.h"
include "Config.h"
#include "View.h"
#include "UIButton.h"
#include "UIElement.h"
#include "Led.h"
#include "UserInfo.h"
#include "WelcomeWidget.h"
#include "UserIdWidget.h"
#include "MenuWidget.h"
#include "SliderWidget.h"
```

```cpp
#include <Framework.h>
#include <Image.h>
#include <Text.h>
#include <SoundPlayer.h>
#include <CameraInterface.h>
#include <VoiceRecognition.h>
#include <opencv2/opencv.hpp>
include <Helpers.h> class KinectCamera;
class CanonPSCamera;

class TableView:
    public View,
    public Stage,
    public CameraInterface::Listener,
    public UIButton::Listener,
    public SliderWidget::Listener,
    public VoiceRecognition::Listener,
    public IEndReachedNotificationSink            // for sound player
{
public:
    virtual void Create();

protected:
    /// overrides View
    virtual void Initialize();
    virtual void Release();
    virtual void Update();
    virtual bool keyPressed(int key);

/// overrides UIButton Listener
    virtual void onButtonClicked( UIButton* sender );
    virtual void onButtonHover( UIButton* sender );
    virtual void onButtonReleased( UIButton* sender );

/// overrides SliderWidget Listener
    virtual void onSliderModified( SliderWidget* sender );

/// tranisition effect
    virtual void playTransitionEffect();

/// overrides Stage
    virtual EStageID GetStageID() { return SID_TABLE; }
    virtual View* GetView() { return this; }
    virtual void OnStageEnter();
    virtual void OnStageExit();

/// overrides camera listener
    virtual void onCameraStillImageReceived();

/// overrides voice reg listener
    virtual void onVoiceReg(const std::string text, float confidence, void* metaData);

/// overrides sound player callback
```

```cpp
        virtual void OnEndReached(CSoundPlayer* pPlayer);

/// overrides ITimerNotificationSink
        virtual void OnTimer(int nTimerID);

protected:
        void OnPeopleDetected();
        void OnUserRegistering(int position);
        void CancelUserRegistration(int position);
        void OnUserRegistered(int position, SUserInfo* user);
        void ShowPictureInMainWall();

/// update kinect
        void updateKinect();

/// update user occupancy based on kinect depth image
        void updateOccupancy();

/// update hand interaction based on kinect depth image
        void updateInteraction();

void setUIState_AllPeopleSeated();

void setUIState_Idle();

void deactivate();

protected:
        // Elements of the UI
        UIButton                m_RegisterButtons[4];      /// 4 register buttons
        CBasicList<UserIdWidget> m_WelcomeElements;        /// 4 register welcome widgets
        UIButton                m_PictureTaken;
        bool                    m_bPictureSelected;
        bool                    m_UserRegistering[4];      /// which user is trying to register
        int                     m_UserOccupancyCounter[4];
        bool                    m_UserSeated[4];
        /// if user at position is seated. if registered but not seated, means the user is standing up
        bool                    m_UserRegistered[4];       /// if position is registered
        //SUserInfo*            m_UserInfo[4];             /// info of the user at position
        UIElement               m_ScanArea;
        /// the scanning area
        UIButton                m_ScanButton;
        /// when triggered a pic is taken
        UIElement               m_PicsTakenCounter;
        /// display the number of pictures taken /// on the table
        // Menu UI elements
        MenuWidget              m_MenuWidget;
        WelcomeWidget           m_WelcomeWidget;
```

```cpp
    SliderWidget                    m_SliderLightWidget;

// sound
    CSoundPlayer                    m_RegisterSound;
    CSoundPlayer                    m_TakePictureSound;
    CSoundPlayer                    m_TransitionSound;
    CSoundPlayer                    m_ReplaySound;
    unsigned int                    m_nWaitCount;           ///  wait for a while before detecting depth change // Kinect
    cv::Mat_<unsigned short>        m_CacheDepthImage;
    KinectCamera*                   m_pKinectCamera;
    cv::Mat1b                       m_InteractionMaskImage; /// mask of foreground, e.g. hand // Camera
    void takeImage();
    void doTakeImage();
    CanonPSCamera*                  m_pCanonCamera;

/// flag to trigger the image taking
    bool                            m_bTakeStillImage;
    unsigned int                    m_nTakeStillImageWaitCount;
};

#endif // __TABLE_VIEW_H
```

TableView.cpp

```cpp
#include "TableView.h"
#include "RootView.h"

#include "DepthUtils.h"
#include "SystemManager.h"
#include "EventManager.h"
#include "UIManager.h"
#include "CalibrationData.h"
#include "AppProjectAR.h"
#include "CameraCalibrationView.h"

#include <KinectCamera.h>
#include <CameraManager.h>
include <CanonPSCamera.h> include <Logger.h> include <sapi.h> include <ofDebug.h>

//---------------------------------------------------------------
#define         WAIT_COUNT              (60*5)  // 5 secs
```

```
#define         SHOW_HAND_MASK                          0
#define         HAND_MASK_WINDOW                        "Hand Mask"
#define         OCCUPANCY_THRESHOLD                     100
#define         TOOL_BUTTON_SIZE                        (0.08f)
#define         REGISTER_BUTTON_SIZE                    (0.08f)
#define         COLOR_BASE_UI
    RGBAColor(2,173,232)
#define         PICTURE_TAKEN_ANIMATION_SPEED   600
define         ENABLE_PICTURE_INPUT_TIMER              0 define PICTURE_TAKEN_X         (0.5f)
define PICTURE_TAKEN_Y         (0.2f)

//-----------------------------------------------------------
typedef struct RotationS {
    RotationS(float rotX = 0, float rotY = 0, float rotZ = 0) {
            SetRotation(rotX, rotY, rotZ);
    } void SetRotation(float frotX, float frotY, float frotZ) {
            this->rotX = frotX;
            this->rotY = frotY;
            this->rotZ = frotZ;
    } struct RotationS operator*(float fRatio) {
            struct RotationS clrDest;
            clrDest.rotX = rotX * fRatio;
            clrDest.rotY = rotY * fRatio;
            clrDest.rotZ = rotZ * fRatio;
            return clrDest;
    } float   rotX;
    float   rotY;
    float   rotZ;
} RotationS;

static const float      _POSITIONS[8]           = { 0.2f, 0.8f, 0.2f, 0.2f, 0.8f, 0.2f,
0.8f, 0.8f };
    static const float      _MENU_POSITIONS[6]      = { 0.6f, 0.1f, 0.6f, 0.2f, 0.6f, 0.3f
};
    static const float      _WELCOME_POSITIONS[8]   = { 0.2f, 0.65f, 0.2f, 0.35f, 0.8f,
0.35f, 0.8f, 0.65f };

#define                 NO_ROTATION
        RotationS(0,0,0)
    #define                 ROTATION_180
        RotationS(0,0,180)

static const RotationS  _ROTATIONS[4]           = { NO_ROTATION,
ROTATION_180, ROTATION_180, NO_ROTATION };

//-----------------------------------------------------------
```

```
void TableView::Create()
{
    m_bTakeStillImage = false;

// register stage
    ::g_StageManager.RegisterStage(this);

for (int i=0; i<4; ++i) {
            m_UserRegistering[i] = false;
            m_UserRegistered[i] = false;
            m_UserSeated[i] = false;
            m_UserOccupancyCounter[i] = 0;
    }

/*************************************************
     *          UI Before                *
     *************************************************/
    m_WelcomeWidget.Create();
    AddElement(&m_WelcomeWidget);

/*************************************************
     *      UI when people are detected       *
     *************************************************/
    for(int i=0; i<4;i++)
    {
            m_RegisterButtons[i].Create("./images/register.png",         "            Please\nRegister",
REGISTER_BUTTON_SIZE,    REGISTER_BUTTON_SIZE,    _POSITIONS[i*2],    _POSITIONS[i*2+1],
UIButton::TP_Below);
            AddElement(&m_RegisterButtons[i]);
            m_RegisterButtons[i].setWaitAnimation(true);
            m_RegisterButtons[i].SetRotation(_ROTATIONS[i].rotX,         _ROTATIONS[i].rotY,
_ROTATIONS[i].rotZ );
            m_RegisterButtons[i].registerToUIManager(&g_UIManager_Table);
            m_RegisterButtons[i].setListener(this);
    }

/*************************************************
     *      UI when people are registered     *
     *************************************************/
    for(int i=0; i<4;i++)
    {
            m_WelcomeElements[i].Create();
            AddElement(&m_WelcomeElements[i]);
            m_WelcomeElements[i].SetRotation(_ROTATIONS[i].rotX,         _ROTATIONS[i].rotY,
_ROTATIONS[i].rotZ );
    }

// the Menu
    m_MenuWidget.Create(this);
    AddElement(&m_MenuWidget);

// the slider element to adjust ligth
    m_SliderLightWidget.Create("Light");
    AddElement(&m_SliderLightWidget);
    m_SliderLightWidget.setListener(this);
```

```
/************************************************
 *          Scan elements                       *
 ************************************************/
m_ScanArea.Create("./images/scan.png",
                                        "Scan",
                                        0.2f,
                                        0.2f,
                                        0.52f,
                                        0.42f);

m_ScanArea.m_Label.SetScale(0.7f);
AddElement(&m_ScanArea);

m_ScanButton.Create("./images/scan_button.png",
                                        "Scan",
                                        TOOL_BUTTON_SIZE,
                                        TOOL_BUTTON_SIZE,
                                        0.445f,
                                        0.55f,
                                        UIButton::TP_Low);

m_ScanButton.registerToUIManager(&g_UIManager_Table);
AddElement(&m_ScanButton);
m_ScanButton.setListener( this );

g_UIManager_Table.setLevelEvent(80);

/************************************************
 *    UI when a picture has been taken          *
 ************************************************/
m_PictureTaken.Create(NULL, "",
                                        0.18f,
                                        0.18f,
                                        PICTURE_TAKEN_X, // center of the scan area
                                        PICTURE_TAKEN_Y,
                                        UIButton::TP_Below);
m_PictureTaken.ShowAnimatedCircle(false);
m_PictureTaken.registerToUIManager(&g_UIManager_Table);
m_PictureTaken.SetRotation(0, 0, 180);
AddElement(&m_PictureTaken);
m_PictureTaken.setListener( this );
m_PictureTaken.setPlaySound( false );

m_PicsTakenCounter.Create("./images/full_circle.png",
                                        "0",
                                        0.1f,
                                        0.1f,

PICTURE_TAKEN_X-0.1,

PICTURE_TAKEN_Y);
m_PicsTakenCounter.SetRotation(0, 0, 180);
AddElement(&m_PicsTakenCounter);

/************************************************
 *              Sounds                          *
 ************************************************/
```

```
m_RegisterSound.LoadSound("./sound/say_name.wav");
m_RegisterSound.AddNotificationSink(this);
AddElement(&m_RegisterSound);

m_TakePictureSound.LoadSound("./sound/take_a_photo.wav");
AddElement(&m_TakePictureSound);

m_TransitionSound.LoadSound("./sound/transition.wav");
AddElement(&m_TransitionSound);

m_ReplaySound.LoadSound("./sound/actionitem.wav");
m_ReplaySound.AddNotificationSink(this);
AddElement(&m_ReplaySound);

/***************************************************
 *              Set UI              *
 ***************************************************/
setUIState_Idle();
m_InteractionMaskImage.create(480, 640);

/***************************************************
 *            Canon object          *
 ***************************************************/
m_pCanonCamera = (CanonPSCamera*) (CameraManager::GetInstance().getCamera("Canon", 0));
}

//---------------------------------------------------------------
void TableView::Initialize()
{
    SetRect(ALIGNMENT_CENTER, HALF_WIDTH, HALF_HEIGHT, FULL_WIDTH, FULL_HEIGHT);

// The welcome widget
    m_WelcomeWidget.SetRect(ALIGNMENT_CENTER,       HALF_WIDTH,       HALF_HEIGHT,
FULL_WIDTH/3, FULL_HEIGHT/3);
    m_WelcomeWidget.SetRotationDestination(0, 0, 360);
    m_WelcomeWidget.SetRotationAnimation(ANIMATION_MODE_LOOP);
    m_WelcomeWidget.StartRotationForDuration(50000, 0);

for(int i=0;i<4;i++)
    {
            m_RegisterButtons[i].setPosition();
            m_WelcomeElements[i].SetRect(ALIGNMENT_CENTER,     _WELCOME_POSITIONS[i*2],
_WELCOME_POSITIONS[i*2+1], 0.1f, 0.1f);
    } m_ScanArea.setPosition();
    m_ScanButton.setPosition();
    m_PictureTaken.setPosition();
    m_PicsTakenCounter.setPosition();

m_MenuWidget.SetRect(ALIGNMENT_CENTER, 0.77f, 0.2f, FULL_WIDTH/2, 0.4f);
    m_MenuWidget.SetRotation(0, 0, 180);

m_SliderLightWidget.SetRect(ALIGNMENT_CENTER, 0.1f, 0.5f, FULL_WIDTH/5, 0.4f);
    m_SliderLightWidget.SetRotation(0, 0, 180);
```

```cpp
    CInterfaceGroup::Initialize();

// hack, skip initial 'waiting for people' clock, directly show registration view
    OnPeopleDetected();

VoiceRecognition::GetInstance().setGramma( L"grammar/registration.xml" );
    VoiceRecognition::GetInstance().setListener( this );
    VoiceRecognition::GetInstance().setEnabled ( false );

m_bPictureSelected = false;

//g_SystemManager.m_Led->TurnOnTheLightMax();
}

//------------------------------------------------------------
void TableView::Release() {
    deactivate();

g_TimerEngine.KillTimer(ENABLE_PICTURE_INPUT_TIMER, this);
    VoiceRecognition::GetInstance().setListener( 0 );
    CContainer::Release();
}

//------------------------------------------------------------
void TableView::ShowPictureInMainWall()
{
    // main wall will use this occupancy counter value to decide which user is missing
    for (size_t i=0; i<4; ++i) {
            //g_EventManager.m_LastTableOccupancyCounter[i] = m_UserOccupancyCounter[i];
    }
    g_pAppProjectAR->SwitchToUI( Stage::SID_MAINWALL );
}

//------------------------------------------------------------
void TableView::OnTimer(int nTimerID)
{
    if (nTimerID == ENABLE_PICTURE_INPUT_TIMER) {
            m_PictureTaken.enableInput(true);
    }
}

//------------------------------------------------------------
void TableView::Update()
{
    if (!m_bActive) {
            return;
    }

View::Update();

// image received, animate it...
    if ( g_EventManager.m_PictureTaken ) { std::string picDynamicPath;
            char* path                      = "./images/scannedPicsOnTable/";
            int currentPic_i                = g_SystemManager.m_LastPicTakenOnTable;
```

```
            char currentPic_c[100];
            itoa(currentPic_i, currentPic_c, sizeof(currentPic_c));
            char* extension              = ".jpg";

picDynamicPath = path;
            picDynamicPath += currentPic_c;
            picDynamicPath += extension;

// animate picture from scan area position to dest position
            m_PictureTaken.SetIcon(picDynamicPath.c_str());
            m_PictureTaken.getImage().SetRotation(0, 0, 180);
            m_PictureTaken.setPosition(m_ScanArea.GetCenterX(), m_ScanArea.GetCenterY());
            m_PictureTaken.SetScale(0.01f);
            m_PictureTaken.ShowElement(true);
            m_PictureTaken.SetTravelDestination(PICTURE_TAKEN_X, PICTURE_TAKEN_Y);
            m_PictureTaken.StartTravelForDuration(PICTURE_TAKEN_ANIMATION_SPEED);
            m_PictureTaken.SetScaleDestination(1.0f);
            m_PictureTaken.StartScaleForDuration(PICTURE_TAKEN_ANIMATION_SPEED);
            m_PictureTaken.enableInput(false);
            g_TimerEngine.RegisterOnceTimer(ENABLE_PICTURE_INPUT_TIMER,
PICTURE_TAKEN_ANIMATION_SPEED, this);

//update and show the counter of pics...
            m_PicsTakenCounter.m_Label.SetText(currentPic_c);
            m_PicsTakenCounter.ShowElement(true);

g_EventManager.m_PictureTaken = false;
     }

// don't interact until motor has rotated to the right position (5 secs)
     if (m_nWaitCount<WAIT_COUNT) {
            m_nWaitCount++;
     } else {
            // update kinect
            updateKinect();

// update user occupancy based on kinect depth image
            updateOccupancy();

// update hand interaction based on kinect depth image
            updateInteraction();
     }

// deferred image taking
     if (m_bTakeStillImage) {
            if (++m_nTakeStillImageWaitCount == 10) {          // delay, so that ui can update
                   doTakeImage();
            }
     }
}

//-------------------------------------------------------------
void TableView::updateKinect()
{
     // get depth from kinect camera
     const cv::Mat_<unsigned short>* depth;
```

```
        const cv::Mat_<cv::Vec3b>* color;
        m_pKinectCamera->lockDepthColorImages(depth, color);
        depth->copyTo(m_CacheDepthImage);
        m_pKinectCamera->unlockDepthColorImages();
}

//-------------------------------------------------------------
void TableView::updateOccupancy()
{
        // detect people's presence if ( !g_config.conf_calibration_mode )
        {
                int zone = g_SystemManager.m_eCurrentProjectionZone;

//size_t      diff    =    GetDepthDifferenceAreaSize(    m_CacheDepthImage,
g_CalibrationData.m_BackgroundDepth[zone], 20 );
                //printf("===> diff = %d\n", diff);

//Find out who is seated
                //printf("\n");
                //printf("UR %d\n", m_UserOccupancyCounter[2]);
                if (GetOccupancy(m_CacheDepthImage(cv::Range(8, 150), cv::Range(85, 270)), 2450, 10000))
                        m_UserOccupancyCounter[2]++;
                else
                        m_UserOccupancyCounter[2]--;
                //printf("LR %d\n", m_UserOccupancyCounter[3]);
                if  (GetOccupancy(m_CacheDepthImage(cv::Range(380,  479),  cv::Range(46,   250)),  2150,
1600000))
                        m_UserOccupancyCounter[3]++;
                else
                        m_UserOccupancyCounter[3]--;
                //printf("UL %d\n", m_UserOccupancyCounter[1]);
                if (GetOccupancy(m_CacheDepthImage(cv::Range(8, 150), cv::Range(270, 500)), 2450, 10000))
                        m_UserOccupancyCounter[1]++;
                else
                        m_UserOccupancyCounter[1]--;
                //printf("LL %d\n", m_UserOccupancyCounter[0]);
                if  (GetOccupancy(m_CacheDepthImage(cv::Range(380,  479),  cv::Range(250,   520)),  2150,
1600000))      //300,350~500,380
                        m_UserOccupancyCounter[0]++;
                else
                        m_UserOccupancyCounter[0]--;
                for(int i=0; i<4;i++)
                {
                        m_UserOccupancyCounter[i]      =     constrain_i(m_UserOccupancyCounter[i],      0,
OCCUPANCY_THRESHOLD);
                }

// detect people seated and show/hide registration buttons
                for(int i=0; i<4;i++)
                {
                        if(!m_UserRegistered[i]) {
                                // user seated
                                if (m_RegisterButtons[i].isEnabled() == false && m_UserOccupancyCounter[i]
>= OCCUPANCY_THRESHOLD && !m_UserRegistering[i])
```

```
                {
                        m_UserSeated[i] = true;
                        m_RegisterButtons[i].setEnabled(true);
                        m_UserRegistering[i] = false;

m_WelcomeElements[i].ShowElement(false);
                }
                // user not available
                else if ((m_RegisterButtons[i].isEnabled() == true || m_UserRegistering[i] ==
true) && m_UserOccupancyCounter[i] == 0)
                {
                        if (m_UserRegistering[i] == true) {
                                CancelUserRegistration(i);
                        } m_UserSeated[i] = false;
                        m_RegisterButtons[i].setEnabled(false);
                        m_RegisterButtons[i].stopWaitAnimation();

m_WelcomeElements[i].ShowElement(false);
                }
            }
        }

// detect who is standing up
        for(int i=0; i<4;i++)
        {
            if( m_UserRegistered[i] ) {
                if (m_UserOccupancyCounter[i] < 50) {
                    //LogInfo( (LOG_VERBOSE_PROJECTAR, 1, "User [%d] standed
up\n", i) );
                    if (!g_EventManager.m_UserInfo[i]) {
                        LogError( (true, "Internal error: User is registered, but user
info is NULL") );
                    }
                    g_EventManager.m_StandingUser = g_EventManager.m_UserInfo[i];
                }
            }
        }

}
}

//-------------------------------------------------------------
void TableView::updateInteraction()
{
    if ( !g_config.conf_calibration_mode )
    {
        int zone = g_SystemManager.m_eCurrentProjectionZone;

// detect hand interaction
        GenerateDepthDifferenceMask(      m_InteractionMaskImage,      m_CacheDepthImage,
g_CalibrationData.m_BackgroundDepth[zone], 20, 50 );    // 5 cm depth change if SHOW_HAND_MASK
        cv::imshow( HAND_MASK_WINDOW, m_InteractionMaskImage );
```

```
#endif

// pass this mask to UIManager
            ::g_UIManager_Table.updateHandInteraction( m_InteractionMaskImage );
    }
}

//-------------------------------------------------------------
void TableView::onCameraStillImageReceived()
{
    // don't need max light any more
    g_SystemManager.m_Lcd->TurnOnTheLight();
    m_SliderLightWidget.setValue(10000 / 255);

// restore UI
    m_ScanArea.ShowElement(true);
    m_ScanButton.setEnabled(true);

// set this flag, so deferred action will happen after update()
    g_EventManager.m_PictureTaken = true;

// increase last pic taken counter
    g_SystemManager.m_LastPicTakenOnTable++;

if (m_pCanonCamera) {
            // get buffer from camera
            char* pBuffer;
            unsigned int size;
            m_pCanonCamera->getJpegImageBuffer(pBuffer, size);

// save as file
            std::ofstream file;
            // build pic file name like : "./images/scannedPicsOnTable/1.jpg"...
            std::string picDynamicPath;
            char* path                  = "./images/scannedPicsOnTable/";
            int currentPic_i            = g_SystemManager.m_LastPicTakenOnTable;
            char currentPic_c[100];
            itoa(currentPic_i, currentPic_c, sizeof(currentPic_c));
            char* extension             = ".jpg";

picDynamicPath = path;
            picDynamicPath += currentPic_c;
            picDynamicPath += extension;

printf("File path = %s\n", picDynamicPath.c_str());

file.open(picDynamicPath, std::ios::binary | std::ios::out);
            file.write(pBuffer, size);
            file.close();
    }
}

//-------------------------------------------------------------
void TableView::onVoiceReg(const std::string text, float confidence, void* metaData)
{
    LogInfo( (LOG_VERBOSE_PROJECTAR, 1, "onVoiceReg '%s', %f\n", text.c_str(), confidence) );
```

```
    if (!m_bActive) {
            return;
    } if (confidence < 0.9f) {
            return; // PLEASE DO NOT COMMENT OUT!!
    }

SPPHRASE* spPhrase = (SPPHRASE*)(metaData);
    if (spPhrase==0) {
            LogError( (false, "SPPHRASE is NULL") );
            return;
    } if (spPhrase->pProperties==0) {
            LogError( (false, "SPPHRASE->pProperties is NULL") );
            return;
    }

ULONG VID = spPhrase->pProperties->vValue.ulVal;
    LogInfo( (LOG_VERBOSE_PROJECTAR, 1, "     VID=%d\n", VID) );

SUserInfo* user = GetUserByID( VID );
    if (!user) {
            LogInfo( (LOG_VERBOSE_PROJECTAR, 1, "     VID %d doesn't match any user.\n", VID) );
            return;
    } for (int i=0; i<4; ++i) {
            if (m_UserRegistering[i]) {
                    OnUserRegistered(i, user);
                    VoiceRecognition::GetInstance().setEnabled(false);
                    break;
            }
    }
}

//-------------------------------------------------------------
void TableView::OnEndReached(CSoundPlayer* pPlayer)
{
    LogInfo( (LOG_VERBOSE_PROJECTAR, 1, "sound OnEndReached (%p)\n", pPlayer) );

if (pPlayer == &m_RegisterSound) {
            VoiceRecognition::GetInstance().setEnabled( true );
    } else if(pPlayer == &m_ReplaySound)
    {
            m_MenuWidget.getMenuReplayVoiceButton()->SetIcon("./images/replay_voice.png");
    }
}

//-------------------------------------------------------------
void TableView::OnPeopleDetected()
{
```

```
        g_SystemManager.m_Led->TurnOnTheLight();
        m_SliderLightWidget.setValue(10000 / 255);
}

//-------------------------------------------------------------
void TableView::OnUserRegistering(int i)
{
        m_RegisterButtons[i].setEnabled(false);              // hide register button
        m_UserRegistering[i] = true;

VoiceRecognition::GetInstance().setEnabled( false ); // disable voice recognition, otherwise it will pickup sound from speaker // it will be re-enabled after sound play finishes
        m_RegisterSound.Play();
}

//-------------------------------------------------------------
void TableView::OnUserRegistered(int i, SUserInfo* user)
{
        m_UserRegistered[i] = true;
        g_EventManager.m_UserInfo[i] = user;

m_WelcomeWidget.ShowElement(false);
        m_MenuWidget.setEnabled(true);
        m_SliderLightWidget.setEnabled(true);

CancelUserRegistration(i);

// change ui:
        m_WelcomeElements[i].ShowElement(true);              // show welcome message
        if (user)
        {
                m_WelcomeElements[i].SetText( user->m_DisplayName.c_str() );
                if (!user->m_Icon.empty()) {
                        printf("Load ico of user not implemented anymore because of display as UserIdWidget");
                        //m_WelcomeElements[i].SetIcon( user->m_Icon.c_str() );
                }
        }
        m_ScanArea.ShowElement(true);                        // show scan area
        m_ScanButton.setEnabled(true);                       // enable scan button
}

//-------------------------------------------------------------
void TableView::CancelUserRegistration(int position) {
        m_UserRegistering[position] = false;
        for (int j=0; j<4; j++) {
                if (j != position) {
                        m_RegisterButtons[j].SetText(" Please\nRegister");
                        if (!m_UserRegistered[j]) m_RegisterButtons[j].startWaitAnimation();
                }
        }
        VoiceRecognition::GetInstance().setEnabled(false);
}

//-------------------------------------------------------------
```

```
void TableView::setUIState_Idle()
{
    // if people are not detected : hide everything but the clock
    m_WelcomeWidget.ShowElement(true);

m_ScanArea.ShowElement(false);
    m_ScanButton.setEnabled(false);
    m_PictureTaken.ShowElement(false);
    m_MenuWidget.setEnabled(false);
    m_SliderLightWidget.setEnabled(false);
    m_PicsTakenCounter.ShowElement(false);

for(int i=0; i<4;i++)
    {
            m_RegisterButtons[i].setEnabled(false);
            m_WelcomeElements[i].ShowElement(false);
    }
}

//--------------------------------------------------------------
void TableView::setUIState_AllPeopleSeated()
{
    // if people are detected : display the register button OR the Welcome message if
    // position is registered
    m_WelcomeWidget.ShowElement(false);
    m_SliderLightWidget.setEnabled(true);
    m_MenuWidget.setEnabled(true);

// show registration buttons
    for(int i=0; i<4;i++)
    {
            m_UserOccupancyCounter[i] = OCCUPANCY_THRESHOLD;

if(!m_UserRegistered[i])
            {
                    m_RegisterButtons[i].setEnabled(true);
                    m_UserRegistering[i] = false;
                    g_EventManager.m_UserInfo[i] = 0;

m_WelcomeElements[i].ShowElement(false);
            }
    }
}

//--------------------------------------------------------------
void TableView::takeImage()
{
    g_EventManager.m_PictureTaken = false;
    m_bPictureSelected = false;
    m_bTakeStillImage = true;          // set the flag.  image will be taken on next update()
    m_nTakeStillImageWaitCount = 0;
    m_ScanArea.ShowElement(false);
    m_ScanButton.setEnabled(false);
}

//--------------------------------------------------------------
```

```
void TableView::doTakeImage()
{
    m_bTakeStillImage = false;
    g_SystemManager.m_Led->TurnOnTheLightMax();
    m_SliderLightWidget.setValue(100);
    if ( m_pCanonCamera ) {   // real
            m_pCanonCamera->setZoom(20);
            m_pCanonCamera->setExposureMode(EXP_Av);
            m_pCanonCamera->setISO(ISO_100);
            m_pCanonCamera->setAv(AV_8_0);
            m_TakePictureSound.Play();
            m_pCanonCamera->takeStillImage();
    } else {                                  // fake a delay
            Sleep(2000);
            onCameraStillImageReceived();
    }
}

//------------------------------------------------------------
bool TableView::keyPressed(int key)
{
    switch (key)
    {
    case 'c':
            //---------------- camera calibration -------------------------------------------
            CameraCalibrationView::SetKinectToCalibrate( m_pKinectCamera );
            ::g_StageManager.EnterNewStage( SID_CALIBRATION );
            break;

case 'p':
            //---------------- user present -------------------------------------------
            OnPeopleDetected();
            break;

case 'o':
            //---------------- all users seated -------------------------------------------
            setUIState_AllPeopleSeated();
            break;

case 't':
            //---------------- take a still image -------------------------------------------
            onButtonClicked(&m_ScanButton);
            break;

case 'a' :
            //-------------- people registrering at 0 -------------------------------------
            onButtonClicked(&(m_RegisterButtons[0]));
            break;

case 'q' :
            //-------------- people registrering at 1 -------------------------------------
            onButtonClicked(&(m_RegisterButtons[1]));
            break;

case 'w' :
            //-------------- people registrering at 2 -------------------------------------
```

```
                    onButtonClicked(&(m_RegisterButtons[2]));
                    break;

case 's' :
                    //--------------- people registrering at 3 -------------------------------------------
                    onButtonClicked(&(m_RegisterButtons[3]));
                    break;

default:
                    // --------------- Default --------------------------------------
                    return false;
                    break;
        } return true;
}

//-------------------------------------------------------------
void TableView::onButtonClicked( UIButton* sender )
{
        if (!m_bActive) {
                    return;
        }

//---------------- take a still image -----------
        if (sender == &m_ScanButton) {
                    takeImage();
                    return;
        }

//---------------- registration button ----------
        for(int i=0;i<4;i++)
        {
                    // if the register button animation has ended => registration is done
                    // and we can trigger the welcone message to appear...
                    if(sender == &(m_RegisterButtons[i]))
                    {
                            bool bSomebodyIsRegistering = false;
                            for(int j=0; j<4; j++) {
                                    if (j != i) {
                                            bSomebodyIsRegistering |= m_UserRegistering[j];
                                    }
                            }
                            if (!bSomebodyIsRegistering) {
                                    OnUserRegistering(i);
                                    for (int j=0;j<4;j++) {
                                            if (j != i) {
                                                    m_RegisterButtons[j].delayHover();
                                                    m_RegisterButtons[j].stopWaitAnimation();
                                                    m_RegisterButtons[j].stopGrowAnimation();
                                                    m_RegisterButtons[j].SetText("Please\n Wait");
                                            }
                                    }
                            }
                    }
        }
```

```cpp
//---------------- picture button to show a taken pic ----------
if (sender == &m_PictureTaken) {
        // go to main wall and display the image
        m_bPictureSelected = true;
        return;
}
// --------------- if menu close is pressed --------------------
if(sender == m_MenuWidget.getMenuCloseButton())
{
        g_pAppProjectAR->SwitchToUI( Stage::SID_MENU );
}

// --------------- if menu voice record is pressed --------------------
if(sender == m_MenuWidget.getMenuGotoBoardButton())
{
        // go to board view
        g_pAppProjectAR->SwitchToUI( Stage::SID_MAINWALL );
}

// --------------- if menu close is pressed --------------------
if(sender == m_MenuWidget.getMenuReplayVoiceButton())
{
        if (m_ReplaySound.IsPlaying()) {
                m_ReplaySound.Stop();
                m_MenuWidget.getMenuReplayVoiceButton()->SetIcon("./images/replay_voice.png");
        } else {
                m_ReplaySound.Play();
                m_MenuWidget.getMenuReplayVoiceButton()-
>SetIcon("./images/stop_player_recorder.png");
        }
    }
}

//-------------------------------------------------------------
void TableView::onButtonHover( UIButton* sender )
{
    //
}

//-------------------------------------------------------------
void TableView::onButtonReleased( UIButton* sender )
{
    //----------- picture button to show a taken pic ----------
    if (sender == &m_PictureTaken) {
        // go to main wall and display the image
        if (m_bPictureSelected == true) {
                ShowPictureInMainWall();
        } m_bPictureSelected = false;
    }
}
```

```
//------------------------------------------------------------
void TableView::onSliderModified( SliderWidget* sender )
{
    if(sender == &m_SliderLightWidget)
    {
            int intensity_int = sender->getValue();
            unsigned char intensity = (unsigned char)(intensity_int * 255 / 100);

//printf("Changed light intensity to %u", intensity);

g_SystemManager.m_Led->TurnOnTheLight(intensity);
    }
}

//------------------------------------------------------------
void TableView::OnStageEnter()
{
    Stage::OnStageEnter();

// play the transision effect
    playTransitionEffect();

// Kinect, use the ceiling one
    m_pKinectCamera                              =                              (KinectCamera*)
(CameraManager::GetInstance().getCamera(g_config.conf_CeilingKinectCameraName,
g_config.conf_CeilingKinectCameraID));

m_nWaitCount = 0;

// set this flag, so we won't go to main wall view right now
    g_EventManager.m_PictureTaken = false;
    m_bTakeStillImage = false;

VoiceRecognition::GetInstance().setEnabled( true );

if (m_pCanonCamera) {
            m_pCanonCamera->addListener(this);
    } if SHOW_HAND_MASK
    cv::namedWindow( HAND_MASK_WINDOW );
#endif

::g_pRootView->AddChildGroup(this);
}

//------------------------------------------------------------
void TableView::deactivate()
{
    if (m_pCanonCamera) {
            m_pCanonCamera->removeListener(this);
    }

VoiceRecognition::GetInstance().setEnabled(false);

#if SHOW_HAND_MASK
```

```cpp
        cv::destroyWindow( HAND_MASK_WINDOW );
#endif
}

//------------------------------------------------------------
void TableView::OnStageExit()
{
    deactivate();

::g_pRootView->RemoveChildGroup(this);
    Stage::OnStageExit();
}

//------------------------------------------------------------
void TableView::playTransitionEffect()
{
    m_TransitionSound.Play();
}
```

UIManager.h

```cpp
#ifndef __UI_MANAGER_
define __UI_MANAGER_ include "IElementUI.h"
include "Helpers.h"
#include "TrajectoryFilter.h"
#include <opencv2/opencv.hpp>

/**
 * Two Singleton class manage ALL the UI elements of the Table and the mainWall view
 */
class UIManager
{
public:
    UIManager();
    virtual ~UIManager();

/// update the UI using the new hand mask
    void updateHandInteraction( const cv::Mat1b& mask );

void addUIElement(IElementUI* uiElement);
    void removeUIElement(IElementUI* uiElement);
    void setListElementUI (const CBasicList<IElementUI*>& listElementUI) { m_listElementUI = listElementUI; }
    const CBasicList<IElementUI*>& getListElementUI () { return m_listElementUI; } inline int getLevelEvent() { return m_LevelEvent; }
    inline void setLevelEvent(int LevelEvent) { m_LevelEvent = LevelEvent; } private:
    CBasicList<IElementUI*>             m_listElementUI;
    CBasicList<ITrajectoryFilter*>      m_listTrajectoryFilters;
    int                                 m_LevelEvent;
```

};

extern UIManager g_UIManager_Table;

extern UIManager g_UIManager_MainWall;

endif // __UI_MANAGER_

UIManager.cpp

```
#ifndef WIN32_LEAN_AND_MEAN
#define WIN32_LEAN_AND_MEAN
endif include <Windows.h> include "UIManager.h"
include "SystemManager.h"
#include "CalibrationData.h"
#include "AppProjectAR.h"
#include "Animation.h"
include <algorithm> include <ofDebug.h> define ENABLE_FILTER   1

// UI Manager for the Table view
UIManager g_UIManager_Table;

//-------------------------------------------------------------------------
// UI manager for the Main Wall view
UIManager g_UIManager_MainWall;

//-------------------------------------------------------------------------
UIManager::UIManager(void)
    : m_LevelEvent(250)
{
}

//-------------------------------------------------------------------------
UIManager::~UIManager(void)
{
    m_listTrajectoryFilters.DestroyElements();
}

//-------------------------------------------------------------------------
void UIManager::addUIElement(IElementUI* uiElement)
{
    if (m_listElementUI.Find(uiElement)==-1) {
            m_listElementUI.Add(uiElement);
#if ENABLE_FILTER
```

```
            m_listTrajectoryFilters.Add(new CMaxFilter(5));
            m_listTrajectoryFilters.GetLast()->Reset();
#endif
    }
}

//---------------------------------------------------------------------------
void UIManager::removeUIElement(IElementUI* uiElement)
{
    int index = -1;
    while ((index = m_listElementUI.Find(uiElement)) != -1) {
            m_listElementUI.RemoveAt(index);
#if ENABLE_FILTER
            delete m_listTrajectoryFilters[index];
            m_listTrajectoryFilters.RemoveAt(index);
#endif
    }
}

//---------------------------------------------------------------------------
void UIManager::updateHandInteraction( const cv::Mat1b& mask )
{
#ifndef SWAP
#define SWAP(x, y, T) do { T temp##x##y = x; x = y; y = temp##x##y; } while (0)
endif // current interaction zone
    int zone = ::g_SystemManager.m_eCurrentProjectionZone;

// check each UI element
    for (int i=0; i<m_listElementUI.Size(); ++i)
    {
            // get coordinate of ui element
            IElementUI* ui = m_listElementUI[i];
            float fx, fy, fwidth, fheight;
            ui->getPosition(fx, fy);
            ui->getSize(fwidth, fheight);

float x0, y0, x1, y1;
            x0 = fx-fwidth/2; x1 = fx+fwidth/2;
            y0 = fy-fheight/2; y1 = fy+fheight/2;

//Compensate for non-orthogonal Kinect orientation
            if (zone == PZ_WallCenter) {
                    y0 += 0.05f;
                    y1 += 0.05f;
            }

// convert to camera space
            int kx0, ky0, kx1, ky1;
            g_CalibrationData.transformViewToKinect(x0, y0, kx0, ky0, zone);
            g_CalibrationData.transformViewToKinect(x1, y1, kx1, ky1, zone);
            if (kx0>kx1) {
                    SWAP(kx0, kx1, int);
            }
            if (ky0>ky1) {
```

```
            SWAP(ky0, ky1, int);
        }

// check how many pixels are in the box
        int sum = 0;
        for (size_t j=max(ky0,0); j<min(ky1,mask.rows); ++j)
        {
            const unsigned char* msk = mask.ptr<unsigned char>(j);
            for (size_t k=max(kx0,0); k<min(kx1,mask.cols); ++k)
            {
                if (msk[k]!=0) {
                    ++sum;
                }
            }
        }

/// trigger button based on 'sum'
#if ENABLE_FILTER
        m_listTrajectoryFilters[i]->Feed((float)sum, 0);
        sum = (int)m_listTrajectoryFilters[i]->GetX();
#endif
        if(sum > m_LevelEvent) {
            ui->onHandHover();
        }
        if(ui->hasHandHover() && sum < m_LevelEvent * 0.9f) {
            ui->onHandRelease();
        } if 0
        if (i == 0) {
            printf("\n");
        }
        printf("hits of button [%d] is %d\n", i, sum);
#endif
    }
}
```

What is claimed is:

1. A smartlight apparatus comprising:
   an integrated case adapted to be installed in a room or within a defined space;
   at least one sensor disposed within the case that detects human movement within the room or space;
   a display device having components disposed within the case and responsively coupled to said sensor;
   a processor coupled to said sensor and programmed to interpret sensed movement and to control the display device in response to human movement within the room or space; and
   a motorized robotic system coupled to said display device and being controlled by said processor to control the physical orientation and pointing direction of said display device.

2. The apparatus of claim 1 wherein said processor is programmed to interface with other computer-implemented systems to define an interface platform whereby said other computer-implemented systems can control and respond to said sensor and can control said display device.

3. The apparatus of claim 1 further comprising a lighting control circuit coupled to said processor and adapted to control room lighting in response to command signals from said processor.

4. The apparatus of claim 1 wherein said at least one sensor includes an eye sensor capable of detecting where a person within the room or space is looking.

5. The apparatus of claim 1 further including an audio system controlled by the processor.

6. The apparatus of claim 1 wherein said at least one sensor includes a microphone.

7. The apparatus of claim 1 wherein the motorized robotic system controls at least one of pan, tilt and zoom of said display device.

8. The apparatus of claim 1 wherein said display device produces a projected virtual image within the room or space and the processor is programmed to respond to human movement by allowing a human to interact with the virtual image using gestural movements, as if pointing to or touching the virtual image.

9. The apparatus of claim 1 further comprising a camera disposed within said case and directed outwardly to capture images projected by said display device;
   the camera being coupled to a data storage system that stores said captured images.

10. The apparatus of claim 9 wherein the motorized robotic system aims the pointing direction of said camera.

11. The apparatus of claim 9 wherein the motorized robotic system aims the pointing direction of said camera based on the pointing direction of said display device.

12. The apparatus of claim 1 further comprising a camera disposed within said case and directed outwardly to capture images projected by said display device;
   said camera being coupled to an optical character recognition system that converts text within a projected image from said display device into alphanumeric characters.

13. The apparatus of claim 1 further comprising a microphone disposed within said case and coupled to a speech recognizer that converts speech utterances captured by said microphone into alphanumeric text.

14. The apparatus of claim 13 further comprising a digital recording system coupled to said microphone that stores sounds captured by said microphone and indexes those stored sounds using said alphanumeric text.

* * * * *